US008239694B2

(12) United States Patent
Saha et al.

(10) Patent No.: US 8,239,694 B2
(45) Date of Patent: Aug. 7, 2012

(54) DYNAMIC FREQUENCY SCALING OF A SWITCHED MODE POWER SUPPLY

(75) Inventors: Juhi Saha, San Diego, CA (US); Ching Chang Shen, La Jolla, CA (US); Timothy Paul Pals, San Diego, CA (US); Soon-Seng Lau, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 594 days.

(21) Appl. No.: 12/395,407

(22) Filed: Feb. 27, 2009

(65) Prior Publication Data

US 2009/0276639 A1 Nov. 5, 2009

Related U.S. Application Data

(60) Provisional application No. 61/041,085, filed on Mar. 31, 2008.

(51) Int. Cl.
G06F 1/26 (2006.01)
H02M 3/335 (2006.01)
G05F 1/00 (2006.01)

(52) U.S. Cl. ............... 713/300; 363/21.02; 323/283
(58) Field of Classification Search .............. 713/300
See application file for complete search history.

(56) References Cited

U.S. PATENT DOCUMENTS

| 7,454,238 | B2 * | 11/2008 | Vinayak et al. | 455/572 |
| 7,471,072 | B2 * | 12/2008 | Fogg et al. | 323/284 |
| 7,791,908 | B2 * | 9/2010 | Na et al. | 363/21.02 |
| 7,855,864 | B2 * | 12/2010 | Andruzzi et al. | 361/91.1 |
| 2002/0137465 | A1 | 9/2002 | Nakano | |
| 2003/0100280 | A1 | 5/2003 | Kusbel et al. | |
| 2006/0220623 | A1 * | 10/2006 | Andruzzi et al. | 323/276 |
| 2008/0031015 | A1 * | 2/2008 | Na et al. | 363/21.02 |

(Continued)

FOREIGN PATENT DOCUMENTS

| EP | 0803997 A2 | 10/1997 |
| EP | 1463365 A2 | 9/2004 |
| KR | 2001081008 A | 8/2001 |

(Continued)

OTHER PUBLICATIONS

International Search Report and Written Opinion—PCT/US2009/038753, International Search Authority—European Patent Office, Sep. 7, 2009.

*Primary Examiner* — Ryan Stiglic

(74) *Attorney, Agent, or Firm* — William M. Hooks

(57) ABSTRACT

System(s) and method(s) are provided for dynamically scaling switching frequencies and clock sources of switched mode power supplies (SMPSs) in a mobile station. Switching frequency is scaled to an optimal value in response to at least one of (i) a change in mode of operation for wireless communication employed by the mobile station, an additional mode of operation is triggered, (ii) a change in operation conditions of a set of loads associated with functionality of the mobile is determined, or (iii) an LO spur set-off by a SMPS in the presence of an interference signal with a frequency splitting from an operational band that matches the SMPS frequency or at least one of its harmonics. Switching frequencies can be selected from a lookup table, or through an analysis of switching frequencies available to the mobile and operational criteria. A set of clock sources can provide an ensemble of switching frequencies.

18 Claims, 16 Drawing Sheets

U.S. PATENT DOCUMENTS

2008/0088289 A1* 4/2008 Fogg et al. ............... 323/283
2008/0104432 A1* 5/2008 Vinayak et al. ........... 713/300
2009/0066308 A1* 3/2009 Fogg et al. ............... 323/284

FOREIGN PATENT DOCUMENTS

| KR | 20080012595 A | 2/2008 |
| WO | WO9534121 A1 | 12/1995 |
| WO | WO0122562 A1 | 3/2001 |

* cited by examiner

DYNAMIC FREQUENCY SCALING OF A SWITCHED MODE POWER SUPPLY

CLAIM OF PRIORITY UNDER 35 U.S.C. §119

This Application for Patent claims the benefit of U.S. Provisional Application Ser. No. 61/041,085 filed on Mar. 31, 2008, and entitled "DYNAMIC FREQUENCY SCALING OF A SWITCHED MODE POWER SUPPLY." The entirety of this application is expressly incorporated herein by reference.

CROSS REFERENCE TO RELATED APPLICATIONS

This Application is related to co-pending and commonly assigned U.S. patent application Ser. No. 12/327,990, entitled "SWITCHING VOLTAGE REGULATOR WITH FREQUENCY SELECTOR" and filed Dec. 4, 2008, whose disclosure is hereby incorporated by reference in its entirety.

BACKGROUND

I. Field

The subject specification relates generally to switched mode power supplies and, more particularly, to switched mode power supplies that dynamically adjust switching frequency based at least in part upon an operation mode for wireless communication, or a band or channel in which the mode operates.

II. Background

In wireless communication, information is typically multiplexed, modulated, digitized, and conveyed over the air-interface through carriers with frequencies with specific frequency bands. Numerous wireless communications bands are available, even though the majority of bands are regulated. Wireless bands can be associated with specific technologies for wireless communications. Each of these technologies provides a mode for wireless communication, wherein each mode exploits bandwidth, or available spectral space allocated to the technology, in specific manners. The specific aspects employed for communication by the various technologies generally are identified as a mode of operation for wireless communication, or simply a mode of operation. Illustrative examples of modes of operation include GSM (global system for mobile communications), EVDO (Evolution Data Optimized), CDMA (code division multiple access), WCDMA (wideband code division multiple access), UMTS (universal mobile telecommunication system), UMB (ultra-mobile broadband), HSPA (high speed packet access), WiMAX (Worldwide Interoperability for Microwave Access), GPS (global positioning system) GLONASS (Global'naya Navigatsionnaya Sputnikova Sistema, or Global Navigation Satellite System (English)), Bluetooth, etc.

Modes of operation have associated protocols for communication (e.g., frequency division multiplexing, time division multiplexing, code division multiplexing, amplitude modulation, frequency modulation, phase modulation, . . . ) and formalisms that support the communication protocols, as well as electronic circuitry that facilitates operation on analog and digital signals and their mutual conversion in order to convey and receive the signals according to a particular mode of operation. In wireless devices, power is provided by a battery which delivers a direct current (DC) voltage largely bound within a specific range, and the battery power is typically converted to DC voltages via an intermediary circuit or power supply in order to power the various electronic circuitry that facilitates wireless communication, as well as to support electronics such as display electronics, sound electronics, programmable logic arrays, application processor(s), memory(ies), and so on. To perform efficient power management, switched mode power supplies (SMPSs) are generally employed in wireless communications. In conventional systems, SMPSs operate at a fixed switching frequency, which is generally set when a wireless device powers on, and remains fixed throughout operation. Determination of a suitable switching frequency for a given mode of operation may be time consuming and relies upon laboratory testing; however, such expense may be justified in conventional systems that operate in substantially a single mode of operation.

As wireless technology continues to increase its presence in individuals' daily routines, market forces are heavily driving wireless technology advances with the objective to deliver improved services, e.g., data rate, content, and mobility. Moreover, as business and personal development becomes more global in nature, to ensure an expected and consistent wireless presence, wireless devices are migrating from single-mode apparatuses to multi-mode, multi-service work and entertainment mobile platforms. Accordingly, power management typically accomplished through SMPSs operating at static switching frequencies optimized for a single mode and service (e.g., voice) are becoming unable to operate efficiently and without introducing performance degradation. As an example, in view of the rich variety of wireless services provided by network operators, SMPSs have started to degrade quality of wireless service as a result of interference or lower power efficiency than desired.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In one aspect, a method is provided for dynamically adjusting a frequency scalable switched mode power supply (SMPS). A mode of operation for a load component is determined. A power requirement is determined for the mode of operation. A switching frequency source is selected appropriate for a SMPS to power the mode of operation of the load component in accordance with the power requirement.

In another aspect, at least one processor is provided for dynamically adjusting a frequency scalable switched mode power supply (SMPS). A first module determines on a mode of operation for a load component. A second module determines a power requirement of the mode of operation. A third module selects a switching frequency source appropriate for a SMPS to power the mode of operation of the load component in accordance with the power requirement.

In an additional aspect, a computer program product is provided for dynamically adjusting a frequency scalable switched mode power supply (SMPS). A computer-readable storage medium comprises a first set of codes for causing a computer to determine a mode of operation for a load component. A second set of codes causes the computer to determine a power requirement of the mode of operation. A third set of codes causes the computer to select a switching frequency source appropriate for a SMPS to power the mode of operation of the load component in accordance with the power requirement.

In another additional aspect, an apparatus is provided for dynamically adjusting a frequency scalable switched mode power supply (SMPS). Means are provided for determining a mode of operation for a load component. Means are provided for determining a power requirement of the mode of operation. Means are provided for selecting a switching frequency source appropriate for a SMPS to power the mode of operation of the load component in accordance with the power requirement.

In a further aspect, an apparatus is provided for dynamically adjusting a frequency scalable switched mode power supply (SMPS). A mode detector determines a mode of operation for a load component. A switching frequency selector component determines a power requirement of the mode of operation. A switched mode power supply (SMPS) supplies the load component. The switching frequency selector component selects a switching frequency source appropriate for the SMPS to power the mode of operation of the load component in accordance with the power requirement.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
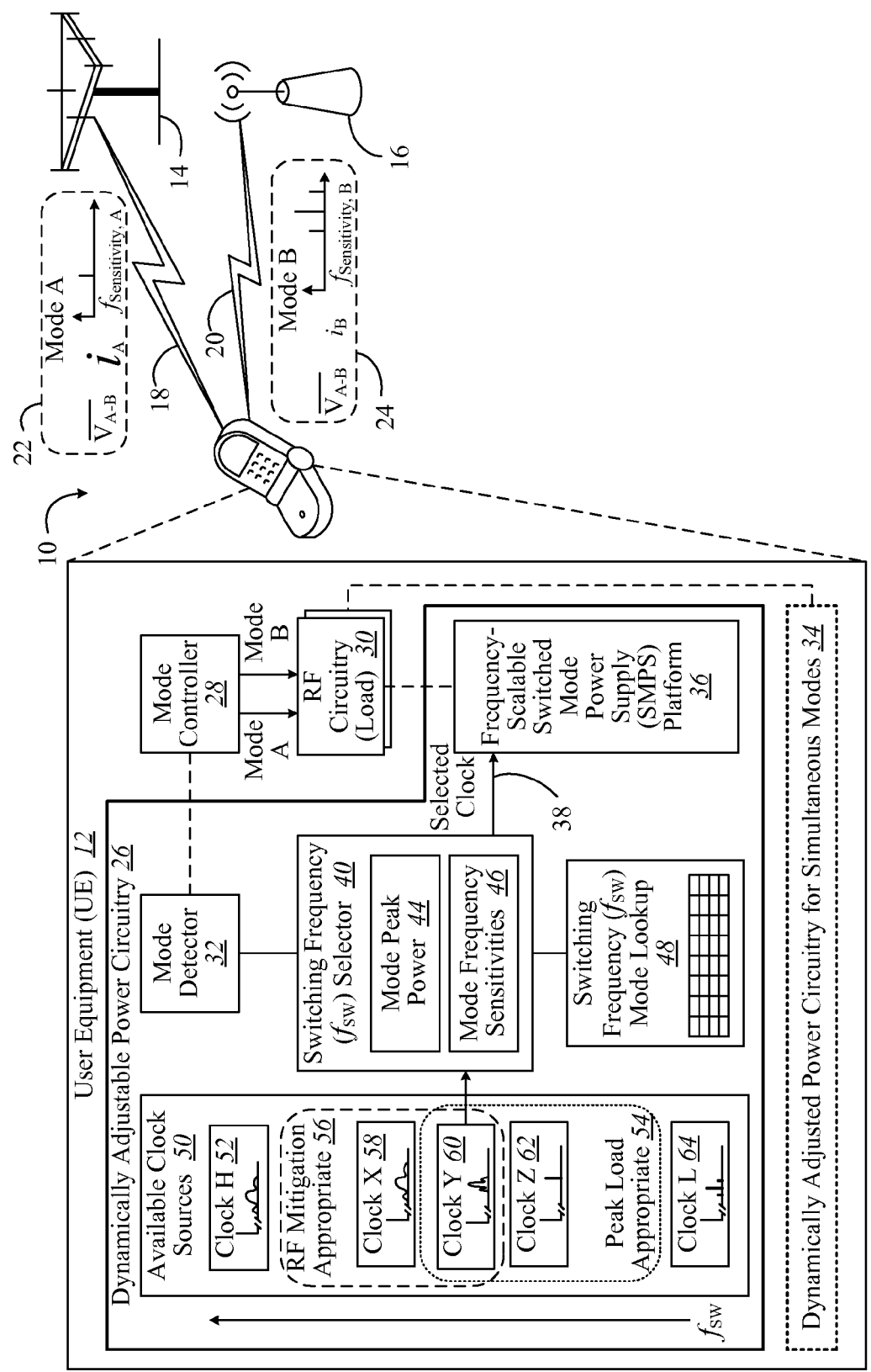
FIG. 1 depicts a block diagram of a dynamically adjusted power circuitry of user equipment of a wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident; however, that such embodiment(s) may be practiced without these specific details. In other instances, well-known structures and devices are shown in block diagram form in order to facilitate describing one or more embodiments.

As used in this application, the terms "component," "module," "system," "platform" and the like are intended to refer to a computer-related entity or an entity related to an operational machine or electronic appliance with one or more specific functionalities. Such entities can be hardware, firmware, a combination of hardware and software, hardware and firmware, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as employed herein the term "power grid" defines specific sets of loads that are powered by unique regulators; loads include electronic circuitry or chipset(s) that provided specific communication functionality. A load may itself be a voltage regulator (i.e., a "subregulator") that powers its own set of loads. The subregulator may provide further conditioning of its parent regulator's output, or the subregulator may change the voltage level delivered to its loads, or the subregulator may isolate its loads from the other loads attached to its parent regulator.

Various embodiments are described herein in connection with a wireless terminal. A wireless terminal may refer to a device providing voice or data connectivity to a user. A wireless terminal may be connected to a computing device such as a laptop computer or desktop computer, or it may be a self contained device such as a personal digital assistant (PDA), or a cellular telephone. A wireless terminal can also be called a system, a subscriber unit, a subscriber station, a mobile station, a mobile terminal, a mobile, a remote station, an access point, a remote terminal, an access terminal, a user terminal, a user agent, a user device, a user equipment, a wireless device, a personal communication system (PCS) telephone, a cordless telephone, a session initiation protocol (SIP) phone, a wireless local loop (WLL) station. In addition, a wireless terminal may refer to a handheld device having wireless connection capability, or other processing device connected to a wireless modem.

Wireless terminals typically communicate over the air-interface with one or more base stations; communication can take place through one or more sectors wherein each sector can sustain communication in specific frequency intervals depending on cell frequency planning determined by a service provider or network operator. In addition, wireless terminals can utilize communication resources (e.g., time-frequency resources) as scheduled by a base station. A base station may also be referred to as an access point, a wireless bridge, an access port, a Node B, an evolved Node B (eNode B), or some other terminology. It should be appreciated that wireless communication can also comprise non-cellular operation, such as Global Positioning System (GPS) devices.

With reference to the Drawings, in FIG. 1, a wireless communication system 10 supports wireless communication between an access terminal (AT), depicted as user equipment (UE) 12, and a network, depicted as base node 14. Alternatively or in addition, the network can comprise an access point 16. For clarity, the UE 12 is depicted as performing two modes of wireless communication either simultaneously or sequentially depicted at 18, 20 with respectively the base node 14 and the access point 16. In particular, Mode A 22 with base node 14 has a particular power requirement, which in the illustrative depiction comprises a constant voltage $v_{A\text{-}B}$, a large current $i_A$, and a frequency sensitivity $f_A$ for noise carried on an input power supply. Mode B 24 with access point 16 has a different power requirement, which in the illustrative depiction comprises a constant voltage $v_{A\text{-}B}$, a relatively lower current $i_B$, and a frequency sensitivity $f_B$ for noise carried on an input power supply.

It should be appreciated with the benefit of the present disclosure that different power requirements ("modes") can arise for single type of wireless communication, especially for modes such as sleeping, radio frequency (RF) transmission, RF receiving, etc. Moreover, even in one type of wireless communication, a plurality of load components that support this wireless communication can have changing power requirements, such as when storage medium is accessed, user interfaces are activated, etc. Consequently, the UE 12 is depicted as having dynamically adjustable power circuitry 26 that is responsive to determining a power requirement, such as by monitoring a power supply output (not depicted). In the exemplary depiction, a mode controller 28 that directs load components, depicted as RF circuitry 30, provides mode information to a mode detector 32 of the power circuitry 26. The mode detector 32 can advantageously determine the mode based upon a parameter value related power to consumption, a control signal, an indication of portions of a power grid that are active, a directly sensed power consumption level (e.g., average or nominal current or voltage), etc.

Second dynamically adjusted power circuitry 34 is depicted as also supporting another portion of RF circuitry 30 in instances where disparate components ("load grid") are simultaneously supported with different power supplies. In one aspect, each power circuitry 26, 34 can be based upon an identical frequency scalable switched mode power supply (SMPS) 36 for economic implementation. Each power circuitry 26, 34 can supply a different selected clock 38 at a switching frequency $f_{SW}$ such that the SMPS 36 provides appropriate power characteristics. Alternatively or in addition, each power circuitry 26, 34 can be dynamically changing this switching frequency $f_{SW}$ as appropriate for dynamically changing load requirements.

In the exemplary power circuitry 26, a switching frequency selector 40 responds to the received mode information from the mode detector 32 to ascertain both a mode peak power requirement 44 and mode frequency sensitivities requirement 46. However, it should be appreciated that applications consistent with aspects disclosed herein can benefit from addressing just one requirement 44, 46. For example, a UE 12 can operate at different transmit or receive frequencies that change frequency sensitivities without necessarily changing power requirements. Alternatively, components without frequency sensitivity can have changing power requirements.

In obtaining power characteristics of this detected mode, various monitoring or prediction circuitry can be used to be implemented. In the exemplary power circuitry 26, a switching frequency mode lookup reference 48 captures this requirements, either installed by an original equipment manufacturer or empirically learned by the UE 12. For instance, a parameter can be sensed that is related to power consumption. In order to expedite performance, this learned behavior of a load component can be stored in a lookup data structure (e.g., table, database) for future reference in selecting a switching frequency.

With the requirements ascertained, the switching frequency selector 40 can select a clock source 50. In the exemplary power circuitry 26, a range of options is constrained for economical manufacture or other constraints. For instance, one or more clock circuits can be scaled up or down or filtered in order to provide a range of switching frequencies. Alternatively or in addition, the clock sources 50 can differ in their respective output frequency spectra, perhaps with certain harmonics attenuated in order to avoid sensitive frequencies. By contrast, rather than having a low quality factor (Q), the clock source 50 can provide a high "Q" in order to illicit proper performance by downstream power supply or power regulation circuits (not shown) or load components 30. These variations in clock sources 50 are depicted as a highest switching frequency clock 'H' 52 that is neither peak load appropriate as depicted at 54 nor RF mitigation appropriate as depicted at 56. A clock 'X' 58 that has a frequency spectra spread in frequency that is RF mitigation appropriate but is too high to be peak load appropriate. A clock 'Y' 60 is appropriate both in power and frequency sensitivity requirements. A clock 'Z' 62 is low enough to be power appropriate but has a high Q central frequency that is not RF mitigation appropriate. A low switching frequency clock 'L' 64 is not appropriate due to power consumption (e.g., too much output current).

By benefit of the foregoing, it should be appreciated that can have adjustable operating frequencies and clock sources. In addition, the clock sources can have different qualities. Based upon a mode of operation (e.g., load value, frequency requirements, clock quality, etc.), the SMPS frequency and clock source can be adjusted (i.e., uniquely or collectively for a set of SMPS's). Selection of the SMPS frequency and clock source can be based upon values that are pre-determined, such as available in a look-up table, or computed on the fly as required.

Figure 2:
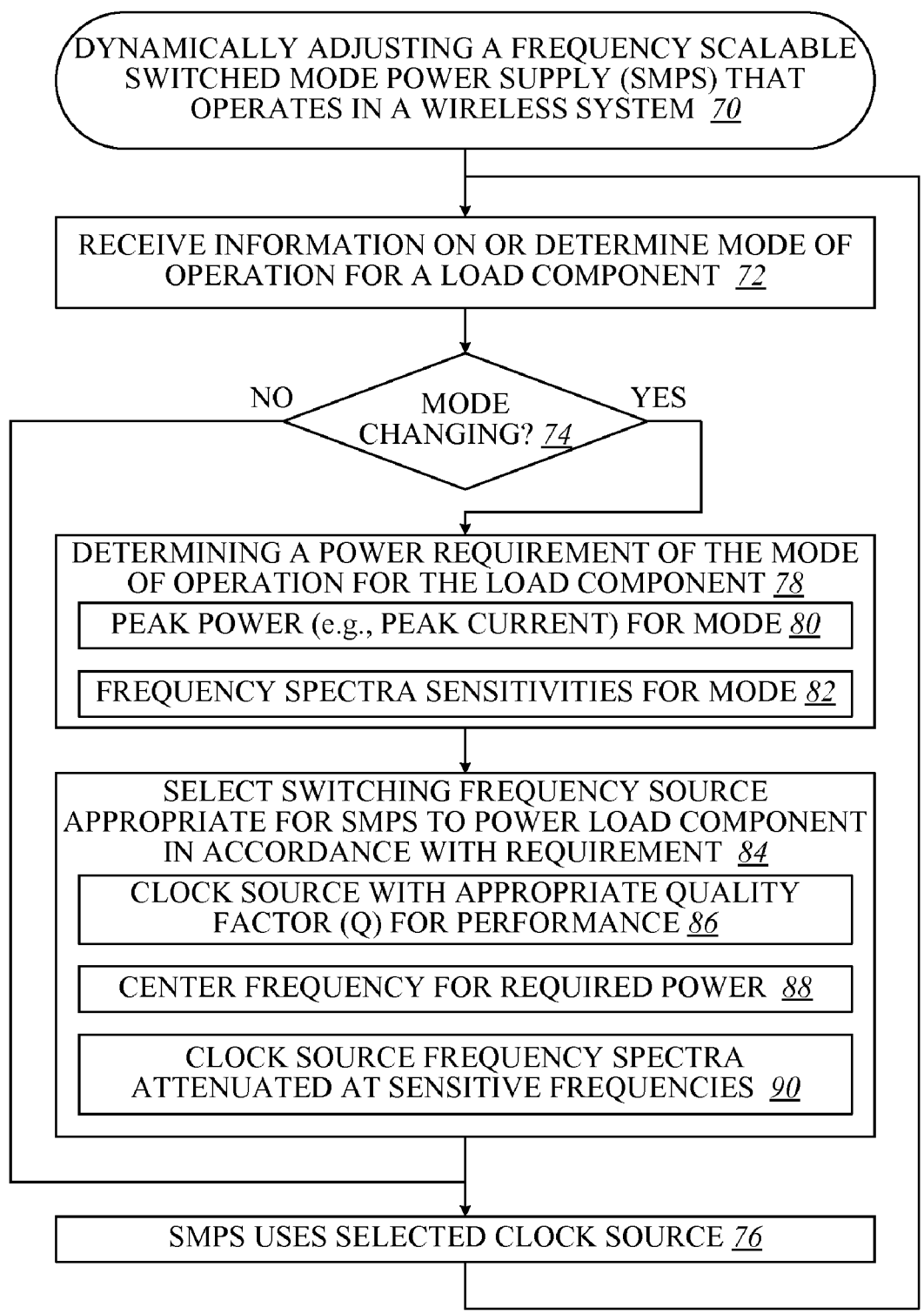
FIG. 2 depicts a flow diagram of a methodology for dynamically adjusting power for a frequency scalable switched mode power supply for the user equipment of FIG. 1.

In FIG. 2, a methodology 70 provides for dynamically adjusting a frequency scalable switched mode power supply (SMPS) that operates in a wireless system. It should be appreciated that the term 'dynamic' can be determined by the OEM, setting the frequency switching of a common SMPS design different per different requirements of the application. In the exemplary methodology 70, this frequency scaling occurs during operation of the SMPS. To that end, information is received on a mode of operation for a load component (block 72). If a determination is made that the power requirements needs are not changing, depicted as a mode changing in block 74, then the SMPS continues to use the selected clock source (block 76). If the mode is changing in block 74, then a determination is made (e.g., looked up, sensed, learned, etc.) as to what the power requirements are for the detected mode of operation for the load component (block 78). In some instances, looking up a predetermined value can be advantageous for processing speed and simplicity in implementation. This determination can comprise determining peak or steady-state power requirements (e.g., current, voltage) for the mode (block 80) and/or determining frequency spectra sensitivities for the mode (block 82). Then a switching frequency source is selected for the SMPS that appropriate for the powering the load component in accordance with the determined requirement(s) (block 84). This selection can be based on one or more factors depicted as selecting a clock source with appropriate quality factor (Q) for satisfactory performance (block 86). Center frequency can be deemed satisfactory for required power consumption (block 88). Clock source frequency spectra can be deemed sufficiently attenuated at sensitive frequencies for selection (block 90). Then the newly selected switching frequency is used by the SMPS in block 76.

A prioritization of factor selection can be employed with weighting predetermined or adaptive. For example, higher or lower power consumption can be traded off for less data rate errors by load components. For instance, selection can begin by selecting a subset of clock sources that can result in adequate peak current for the load component to operate, then clock sources are rank ordered for having optimum power consumption efficiency (e.g., just enough for peak power), and then rank ordered or excluded based upon a threshold for amount of undesirable harmonics.

Figure 3:
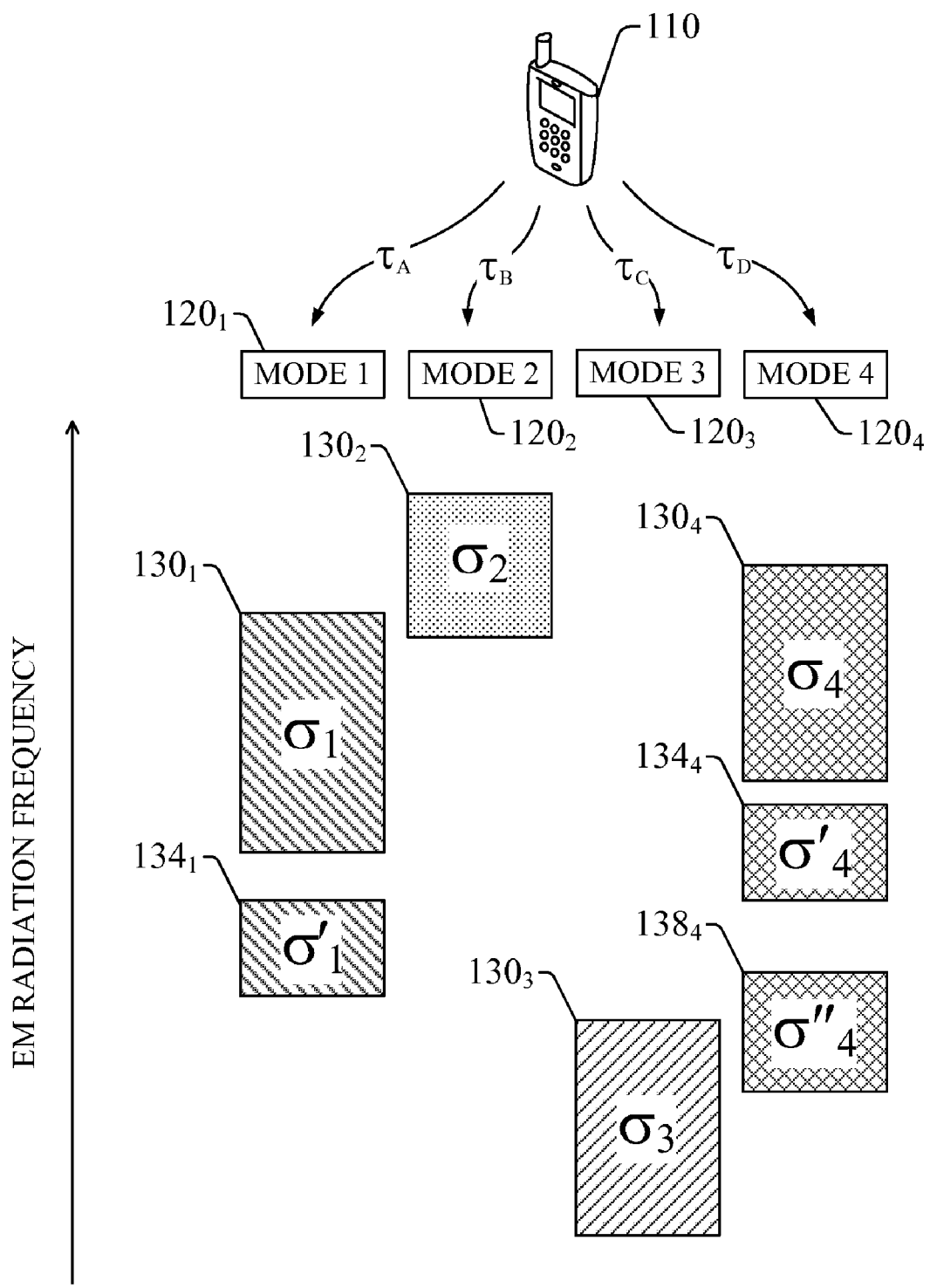
FIG. 3 depicts three example modes of operation of a mobile stations, each mode of operation relies on disparate frequency bands.

FIG. 3 is a diagram 100 that illustrates an example wireless terminal 110 that can operate in four disparate modes 120$_1$, 120$_2$, 120$_3$, and 120$_4$ for wireless communication; each mode 120$_J$ (J=1,2,3, 4) exploits a disparate portion, or band, $\sigma_J$ of the electromagnetic (EM) spectrum (e.g., radio frequency (RF) and microwave frequencies). Bands $\sigma_J$ can be licensed (e.g., like the Industrial, Medical and Scientific bands or PCS A-F bands) or unlicensed RF bands. It is to be appreciated that each $\sigma_J$ can be further divided in sub-bands, or channels, to implement specific modes of communication implementation, e.g., orthogonal frequency division multiplexing which is used in third generation (3G) UMTS, or in WiMAX wireless technologies. It should be appreciated that a mode can have a set of bands (e.g., $\sigma_4$, $\sigma'_4$, and $\sigma''_4$), and channels, in which the mode operates. As an example, for terrestrial wireless communication, an operation mode can utilize various ultra high frequency (UHF) bands, whereas for satellite-based navigation a mode can employ super high frequency (SHF) bands to establish a deep space link. As another example, a wireless device in an ad hoc network can exploit one or more bands in the infrared (IR) portion of the EM spectrum for data transfer and other wireless communication. It should further be appreciated that disparate modes (e.g., mode 1 120$_1$ and mode 4 120$_4$) can operate in respective bands that are at least partially overlapping. As an example, both EVDO and WCDMA data call(s) can be maintained through a PCS F block band or a GSM band.

As indicated above, wireless terminal 110 is generally a multi-mode mobile device and, as illustrated, it can operate in mode 1 120$_1$ at an instant $\tau_A$, in mode 120$_2$ at an instant $\tau_B$, in mode 120$_3$ at an instant $\tau_C$, and mode 4 120$_4$ at an instant $\tau_D$. It is to be appreciated that such instants need not be different as wireless terminal 110 can operate via a processor (e.g., a multi-core processor) that facilitates parallel execution of applications. For example, wireless terminal 110 can operate in GSM to conduct a voice communication and simultaneously operate a GPS application (e.g., display a navigation route). It should also be appreciated that J=1-4 serves as an illustrative example of operation of terminal 110 in four bands; in a wireless environment, fewer or more bands and associated communication modes can be exploited. The number of operation modes for communication that an access terminal supports is typically determined by design. In each mode of operation (e.g., GSM, IMT, CDMA, WCDMA, HSPA WiMAX, GPS, GLONASS, Bluetooth™, . . . ) specific protocols for communication are generally utilized, such as specific multiplexing and modulation, as well as specific time-resources (radio frame time span, symbol time span, and so on) are utilized. Thus, various chipsets provide the necessary functionalities for communication within a specific mode of operation. Additionally, disparate chipsets can provide functionalities for support applications such as display interface(s), sound, sound and image (e.g., speech-to-text and text-to-speech conversions), data input (e.g., operation of keypad(s), touch screen(s), voice input, digital/analog and analog/digital conversion, operation of memories . . . ), and so forth.

Circuitry associated with a chipset has specific load requirements (e.g., operational voltage, peak load current) and, depending on operation mode, the circuitry includes RF electronics that facilitates generation of waveforms at specific frequencies that are modulated for communication. Waveforms can be either single-carrier (e.g., for uplink communication) or multi-carrier (e.g., for downlink communication). A battery in wireless terminal 110 provides power to support all functionality in the mobile device; the battery can supply energy via chemical reaction (e.g., a Li-based battery) or through solar energy conversion (e.g., Si-based, CuGaSe-based, CuInSe-based solar-cell panels). Alternatively, or in addition, other wireless sources of energy may be employed, such as radiation (e.g., microwave) heating of a thermoelectric converter. A set of switched mode power supplies facilitates regulation, or conversion, from battery input voltage ($V_{IN}$) to an output operational voltage $V_{OUT}$ for a set of loads. In an aspect, switched mode power supplies in terminal 110 are switching-frequency scalable, adjusting switching frequency according to a specific mode of operation; e.g., GPS and associated display application, or video telephony through WCDMA.

It is to be noted that the terminal 110 can also operate in the following multiple-access schemes, such as time division multiple access (TDMA), frequency division multiple access (FDMA), orthogonal frequency division multiple access (OFDMA), Single-Carrier FDMA (SC-FDMA), or other suitable multiple-access schemes. TDMA utilizes time division multiplexing (TDM), wherein transmissions for different terminals are orthogonalized by transmitting in different time intervals. FDMA utilizes frequency division multiplexing (FDM), wherein transmissions for different terminals are orthogonalized by transmitting in different frequency subcarriers. In one example, TDMA and FDMA systems can exploit code division multiplexing (CDM), wherein transmissions for multiple terminals can be orthogonalized using different orthogonal codes (e.g., Walsh codes, polyphases codes . . . ) even though the codes are sent in the same time interval or frequency sub-carrier. It is to be noted that, in an aspect, orthogonalization refers to mitigation of interference among the referenced signals. It is to be noted that OFDMA utilizes Orthogonal Frequency Division Multiplexing (OFDM), and SC-FDMA utilizes Single-Carrier Frequency Division Multiplexing (SC-FDM), wherein OFDM and SC-FDM can partition the available system bandwidth into multiple orthogonal sub-carriers (e.g., tones, bins, . . . ), each of which can be modulated with data. Typically, modulation symbols are sent in the frequency domain with OFDM and in the time domain with SC-FDM. Additionally or alternatively, available system bandwidth can be divided into one or more frequency carriers, each of which can contain one or more subcarriers. Implementation of wireless communication can also exploit a combination of multiple-access schemes, such as OFDMA and code division multiple access (CDMA). It should be appreciated that the SMPS frequency management techniques provided herein can be utilized within substantially any wireless communication access scheme. Moreover, the innovation described in the subject specification can be advantageously exploited in at least all the foregoing modes of operation.

Figure 4:
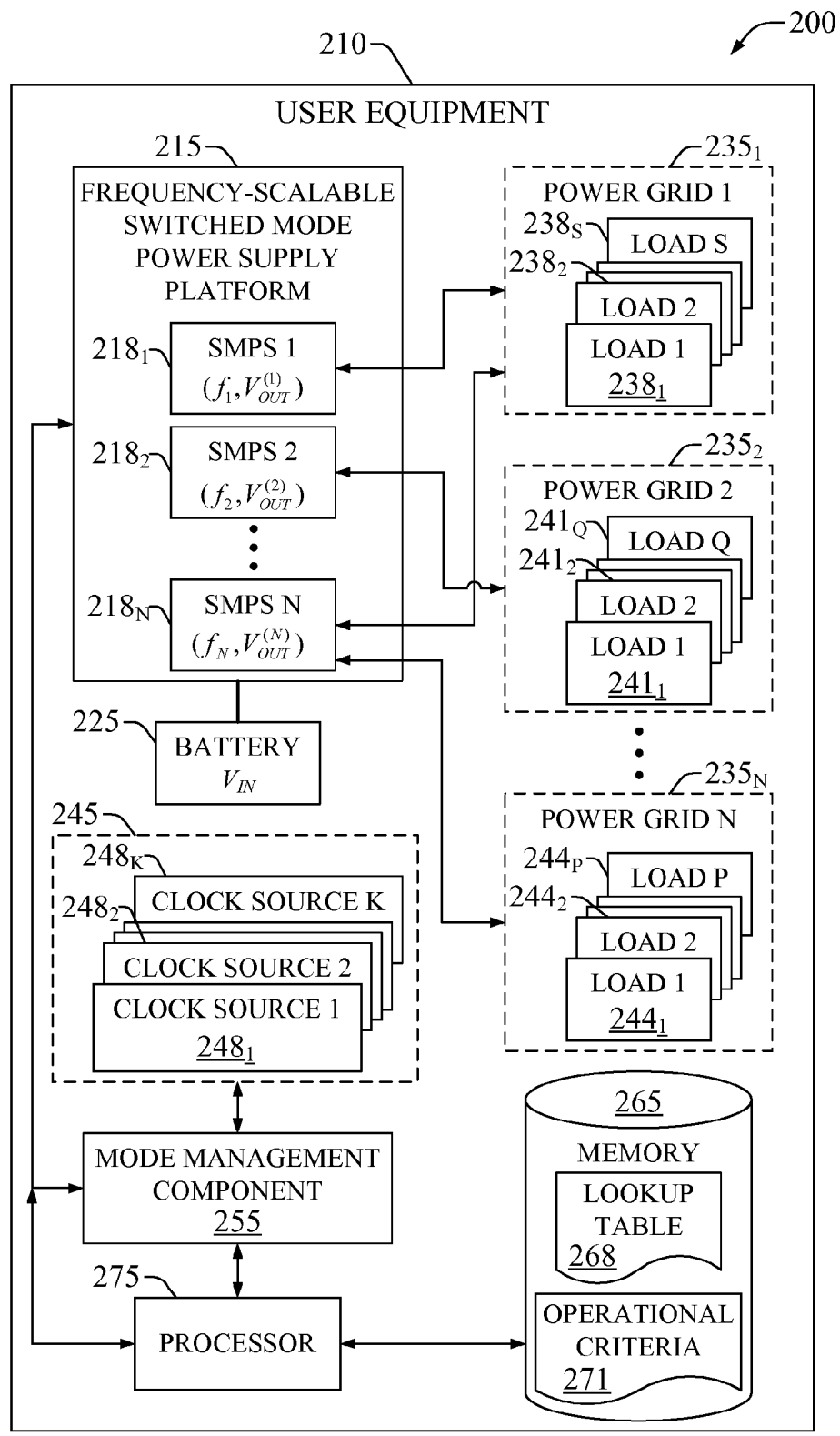
FIG. 4 depicts a block diagram of example user equipment that exploits frequency-scaled switched mode power supply (SMPS) sources.

FIG. 4 is a block diagram 200 of example user equipment (UE) 210 that exploits frequency-scalable switched mode power supply (SMPS) source(s) according to aspects set forth in the subject specification. User equipment 210, which can be a realization of wireless terminal 110, includes a frequency-scalable SMPS platform 215 that is biased by a direct current (DC) battery 225 that provides an input voltage $V_{IN}$. The scalable-frequency SMPS platform 215 comprises a set of N SMPS $218_1$-$218_N$ (N a positive integer; generally $2 \leq N \leq 4$) that power up a set of power grids $235_1$-$235_N$, wherein each power grid includes a specific set of loads (e.g., chipsets for specific telecommunication functionality). It is noted that a load within a set of loads can be a power grid; for instance, the load can be a voltage regulator (e.g., a low-dropout linear (LDL) regulator) and a set of functional loads can be operationally attached to the output of the voltage regulator, which acts as a sub-regulator since it is attached to a SMPS. Each SMPS $218_\lambda$ ($\lambda=1, 2, \ldots, N$) operates at a switching frequency $f_\lambda$ and outputs a voltage $V_{OUT}^{(\lambda)}$. It should be appreciated that in example UE 210 there can be a 1-to-1 relationship between SMPSs (or regulators) $218_1$-$218_N$ and power grids $235_1$-$235_N$. Moreover, one or more of SMPSs $218_\lambda$ can be turned on or off at a single instant depending on the power demand(s) of power grids $235_1$-$235_N$, such power demand(s) substantially dictated by served (e.g., power up) loads. When powering, or serving, a power grid, $f_\lambda$ can be dynamically adjusted according to a mode operation (e.g., mode 2 $120_2$) of user equipment 210. Such mode of operation can be, for example, GSM, IMT, CDMA, WCDMA, HSPA, WiMAX, GPS, GLONASS, Bluetooth™, and so on. Additionally, $f_{80}$ can be dynamically adjusted based at least in part upon changes on load requirements, such as operational peak load current, or initiation of concurrent operation of additional modes (e.g., GPS operation is started during a CDMA 1× call, which can be a voice session, data session, or a combination thereof). Such novel features are discussed next.

User equipment 210 can operate in disparate modes, wherein the disparate modes can be in operation simultaneously, to effect a communication (e.g., voice session, data transfer, online gaming, web browsing, and so on). At least one advantage of multi-mode operation is that UE 210 can utilize a mode that optimizes, or improves, performance—e.g., high data rate, low latency, low bit error rate and packet error rate, and so on. As described above, operation in a specific mode relies on specific loads (e.g., $241_1$-$241_Q$) that provide at least a portion of the functionality necessary to accomplish a communication or a specific operation of user equipment 210. For example, loads can include RF circuitry, MSM (mobile station modem) core functionality, peripherals (e.g., memories, display(s), keypad(s) . . . ) circuitry, and so on. Loads (e.g., $238_1$-$238_S$, $241_1$-$241_Q$, and $244_1$-$244_P$) can have disparate sensitivities or response to frequency (e.g., interference or coupling with local oscillators), and current and voltage requirements; conventionally, loads can be grouped together (clustered) according to such discrepancies in frequency sensitivities and operational requirements.

It is to be appreciated that among the loads (e.g., $238_1$-$238_S$) that provide functionality to user equipment 210, switching frequency $f_J$ of SMPS $218_J$ can interfere with performance of the electronic circuitry of the loads; thus, operation of SMPS $218_J$ can degrade operation of UE 210. It is to be appreciated that a cluster of K1 SMPSs (e.g., SMPS $218_1$ and SMPS $218_2$) can share one switching frequency, while a cluster of K2 SMPSs (e.g., SMPS $218_J$, SMPS $218_{N-1}$ and SMPS $218_N$) can share a disparate switching frequency. Generally such degradation occurs when the circuitry of the loads comprises RF circuitry, and $f_J$ or associated harmonics n $f_J$ (with n a positive integer) lay within the band of frequencies (e.g., $\sigma_J$) supported by the loads. In addition, it should be noted that cross-degradation also can occur, wherein SMPS $218_J$ switching interferes with operation of a load attached to a disparate SMPS $218_K$. Each SMPS can affect substantially all loads in a system by various conductive and radiative means. Accordingly, in the subject innovation, a mode of operation (e.g., GSM voice communication) is determined or established through a mode management component 255. With specific mode information such as EM radiation frequency bands in which the mode is operated, frequency channels scheduled for operation and so forth, processor 275 provides access to a memory 265 that retains a database, or lookup table 268, and selects an appropriate switching frequency $f_J^{(opt)}$ for operation of SMPS $218_J$. It should be appreciated with benefit of the present disclosure that appropriate can entail an acceptable or satisfactory result. Alternatively or in addition, appropriate can entail better than other available options. Alternatively or in addition, appropriate can entail an optimum solution, especially for applications in which sufficient options exist to provide closely matching a criterion or a set of criterion. Alternatively or in addition, appropriate can entail a best option, such as having a highest composite score against weighted criteria. For clarity, in an illustrative aspect described below, an ideal objective for an optimum switching frequency can be discussed, although it should be appreciated that implementations can approach an optimum with varying degrees of fidelity.

In addition, processor 275 can screen a set of available frequencies, e.g., retained in look-up table 268, against operational criteria 271 stored in memory 265, and thus select an optimal frequency that meets specific criteria. Operational criteria can include quality of service metrics to ensure high-quality user-perceived service. It should be appreciated that information stored in look-up table 268 or operational criteria 271 can establish a desired or required equipment response or performance and service quality associated therewith. It should further be appreciated that an optimal frequency is a switching frequency in a set of available frequencies that provides a satisfactory or effective performance and associated service. It should yet further be noted that one or more switching frequencies can afford a satisfactory or optimal operation. At least one advantage of dynamic adjustment of switching frequency and utilization of an optimal frequency is that perceived service quality can be retained even when a mobile stations switches mode of operation.

Handoffs to different operating channels within a communication band (e.g., $\sigma_3$) can require changes in the switching frequency of a serving SMPS. It is to be noted that in a group of N switching frequencies, a set of N-G switching frequencies can remain fixed while G (e.g., G=1) switching frequencies are dynamically scaled. Lookup table 268 provides $f_J^{(opt)}$ for the specific mode of operation. It is to be noted that, in a aspect of the subject innovation, when a mode of operation changes from a first mode to a second mode (e.g., UE 210 initiates data download(s) within HSPA mode after a voice call via CDMA 1×), and the second mode of operation is supported by loads in a power grid powered by illustrative SMPS 218$_J$, a disparate optimal frequency $f_J^{(opt')}$ can be selected dynamically from lookup table 268, or a database accessible through user equipment 210, without resorting to UE downtime or further testing. Furthermore, if mode management component 255 activates another mode of operation (e.g., GPS, and such mode relies on loads such as loads 244$_1$-244$_P$ grouped in a disparate power grid, for example, power grid N 235$_N$, the switching frequency of a SMPS serving that power grid, e.g., SMPS 218$_N$, can also be optimized heuristically via information stored in lookup table 268, or substantially any database accessible to the user equipment 210.

It is to be noted that in the subject innovation a lookup table 268 stored in memory 268 is an effective, low-overhead, low-complexity instrument for selecting an optimal switching frequency since the number of modes supported by a mobile station typically includes a few modes, and optimal frequencies can be predetermined via experimentation (e.g., frequency response of SMPS performance for loads in active/inactive state, wherein frequency response can reflect a degree of interference, or absence thereof, with respect to the loads; load current and voltage requirements, etc.) in the laboratory or field.

In addition to selecting an optimal frequency in accordance with a mode of operation for wireless communication, mode management component 255, assisted by processor 275, can select a clock source from a set of K clock sources 248$_1$-248$_K$ for clocking a switch that drives the switching in the SMPS that is being scaled. Clock sources 248$_1$-248$_K$ can be, for example, different crystal oscillators in the system, relaxation oscillators, and the like. Selection of clock source provides a flexibility to select a high-Q or a low-Q clock to provide the optimal frequency $f_J^{(opt)}$. Selection of clock source typically affects design and cost. Alternatively, or in addition, it is to be noted that selection of a clock source can determine the switching frequency of a SMPS, thereby correlating the selection of a clock source (e.g., 248$_K$) to the selection of a switching frequency. High-Q clocks can be utilized when spectral response of the switch in the SMPS can affect quality of service (e.g., bit error rate, or block error rate) for the UE 210 and a sharp spectral response is desired to avoid interference with frequency tails associated with a low-Q clock source. When large SMPS switching frequencies f are not available, it may be unlikely to avoid an SMPS clock harmonic $f_n = n \cdot f$ falling in-band (n is a positive integer); e.g., within a $\sigma_J$. In such a scenario, a low-Q source clock can be an advantageous alternative as some loads can be more sensitive to narrowband interference; accordingly, the wider spectral lines of a low-Q source are beneficial to operation of UE 210. In an aspect, mode management component 255 can effect a trade-off with respect to Q factor of a clock source (e.g., one of clock sources 248$_1$-248$_K$) utilized to drive the switch of a SMPS. To that end, mode management component can employ an intelligent component (not shown) that can perform utility analysis (e.g., cost-benefit analysis) to determine whether a high-Q or low-Q clock source is advantageous for the operation of a mobile station (e.g., UE 210). Utility analysis can be automated, and can rely on artificial intelligence or machine learning techniques—e.g., decision trees, neural networks, regression analysis, principal component analysis (PCA) for feature and pattern extraction, cluster analysis, genetic algorithm, or reinforced learning—to operation historic data to infer benefits and cost of specific operation mode(s), load requirement(s) and condition(s), and so on.

The subject innovation also contemplates to dynamically scale switching frequency f of a SMPS based at least in part on load operational requirements (e.g., voltage, peak load current, sensitive frequencies) and changes thereof. Thus, a single SMPS (e.g., SMPS 218$_2$) can power multiple modes of operations that demand disparate load configurations. As an example, instead of having one SMPS for GPS (e.g., SMPS 218$_1$ serving power grid 235$_1$) and one SMPS for CDMA 1× (e.g., SMPS 218$_N$ serving power grid 235$_N$), a single SMPS can power both modes (e.g., GPS and CDMA 1×) through switching frequency adjustment. Accordingly, at least one advantage of the subject innovation is to reduce user equipment complexity and bill of materials; both drivers of manufacturing costs.

It is to be noted, however, that a tradeoff between reducing the number of SMPS and gaining SMPS diversity can be achieved in the subject innovation: In view that switching frequency of an SMPS can be dynamically adjusted according to load condition(s), by providing multiple SMPS (e.g., 218$_1$-218$_N$), specific groups of loads (e.g., 244$_1$-244$_P$), or specific power grids, can be optimally operated at certain times (for example, during cell synchronization and re-synchronization, wherein certain correlators are necessary to extract timing and frequency information); thus, SMPS associated with such specific groups can be switched on and off upon demand and the terminal (e.g., UE 210) can consume battery more efficiently.

In addition, mode management component 255 can switch frequency $f_J$ of a SMPS 218$_J$ dynamically in response to changes in load(s) conditions. For instance, when a set of loads or an entire power grid (e.g., grid 235$_N$) operates in a transitory state with a high peak load current demand, frequency can be dynamically switched to provide higher current, e.g., $f_J^{(High)} = f_J^{(opt)} - \Delta f$ (with $\Delta f > 0$), to the set of loads or grid while still avoiding interference with RF circuitry associated with a specific mode of operation. Generally, the lowering of the SMPS switching frequency to handle higher load current is typically associated with performance degradation. Thus, the dynamic adjustment of the switching frequency facilitates tolerating degradation while avoiding a catastrophic malfunction, like power supply instability.

Figure 5:
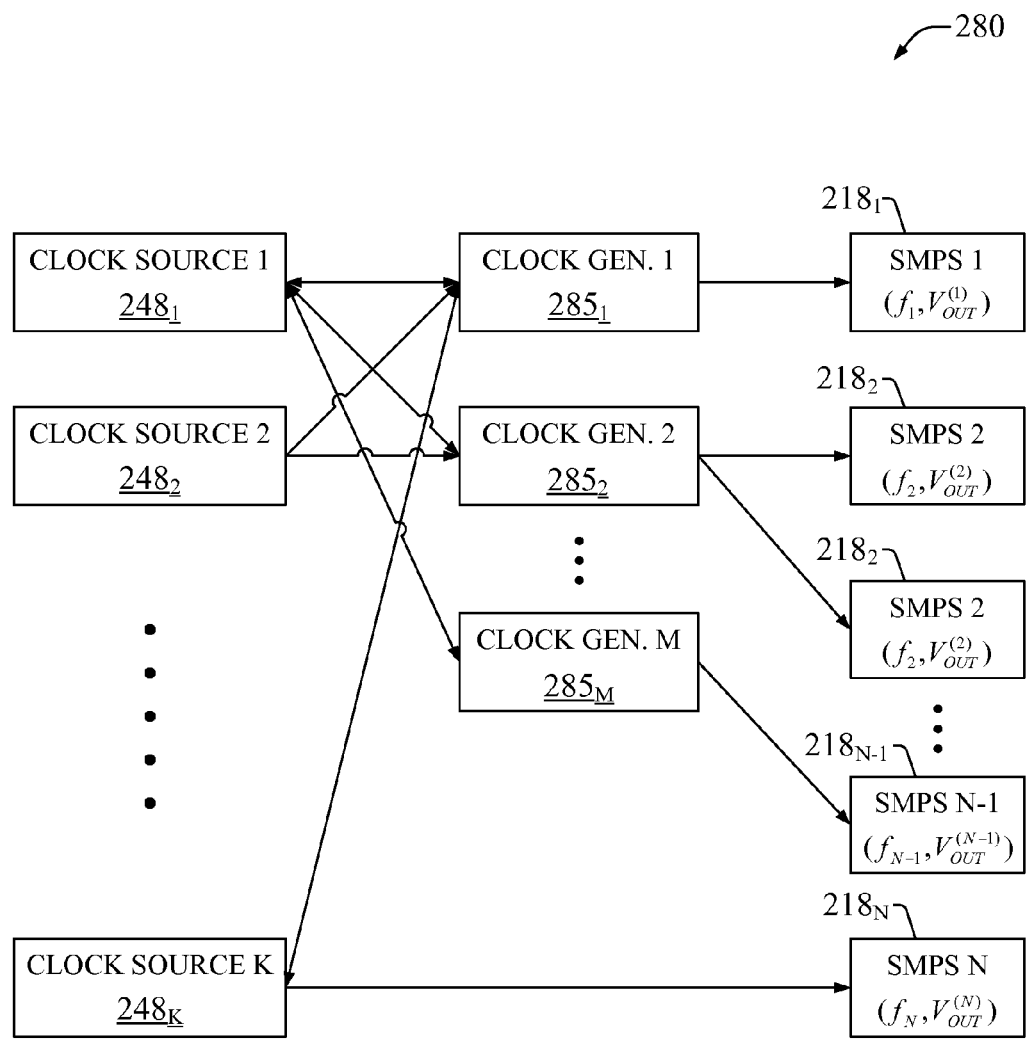
FIG. 5 depicts a block diagram of an exemplary configuration of clock generators that match a clock source to a switched mode power supply.

FIG. 5 illustrates an illustrative configuration 280 of clock generators $285_1$-$285_M$, which can reside in mode management component 255, that match one or more clock sources to an SMPS, and facilitate clock source selection. Example configuration 280 illustrates clock sources $248_1$-$248_K$ attached to clock generator 1 $248_1$, which outputs the switching clock that drives SMPS 1 $218_1$. With respect to SMPS 2 $218_2$ and SMPS 3 $218_3$, they share clock generator 2 $248_2$ as switching driver, which can select from clock sources 1 $248_1$ or clock source $248_2$ 2. Regarding SMPS N-1 $281_{N-1}$, it uses clock source 1 $248_1$. In example configuration 280, SMPS N $218_N$ must use clock source K, with no intervening clock generator. It is to be appreciated that in addition to select a clock source, clock generators $285_1$-$285_M$ can modify the clock source frequency, e.g., through at least one of an integer divider or a fractional divider. For instance, clock generator M $285_M$ can modify the clock source's frequency. At least two advantages of modification of clock source frequency are (i) to increase dynamic range (e.g., upper or lower bounds of an interval) of frequency scalability afforded by frequency-scalable SMPS platform 215, and (ii) to generate a set of switching frequencies without harmonics in a channel tuned by a set of loads served by frequency-scalable SMPS platform 215; the generated switching frequencies can provide optimal power efficiency to the set of loads, and can be retained in lookup table 268, and can facilitate selection of optimal switching frequencies to drive a set of SMPSs in frequency-scalable SMPS platform 215.

Figure 6:
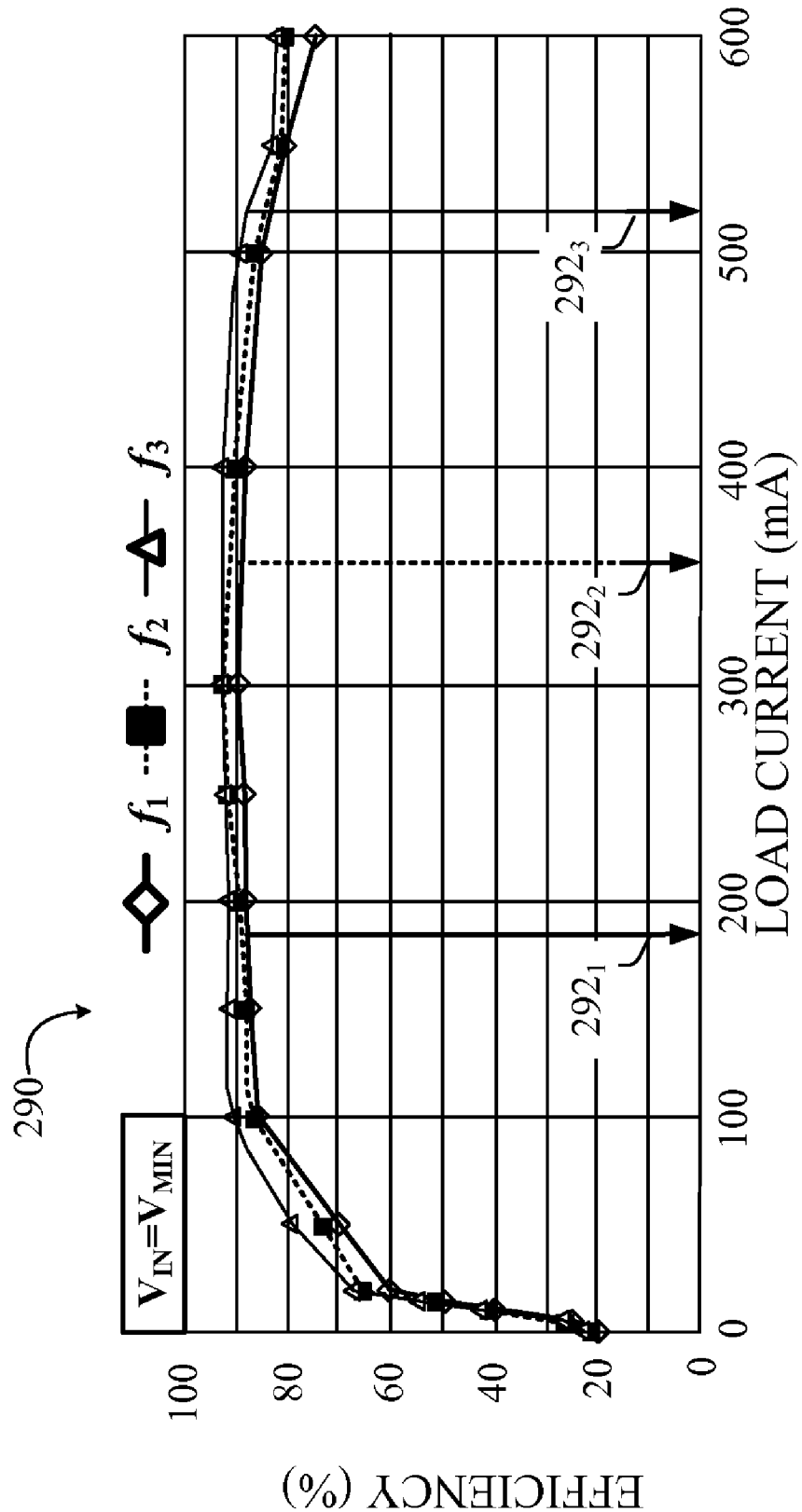
FIGS. 6-8 depict graphical plots of SMPS delivered power efficiency versus load current at disparate switching frequencies in accordance with aspects set forth in the subject specification.
Figure 7:
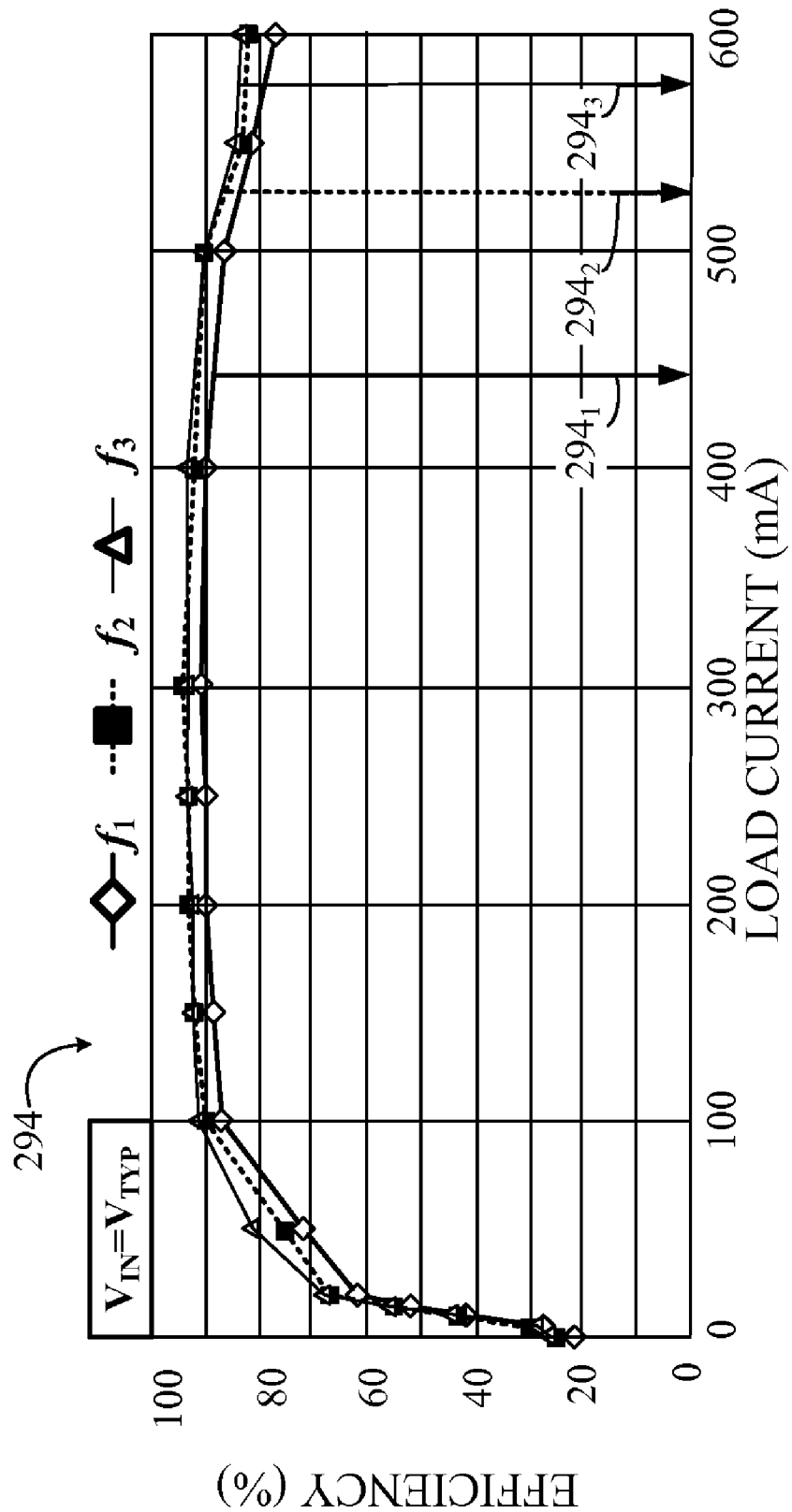
Figure 8:
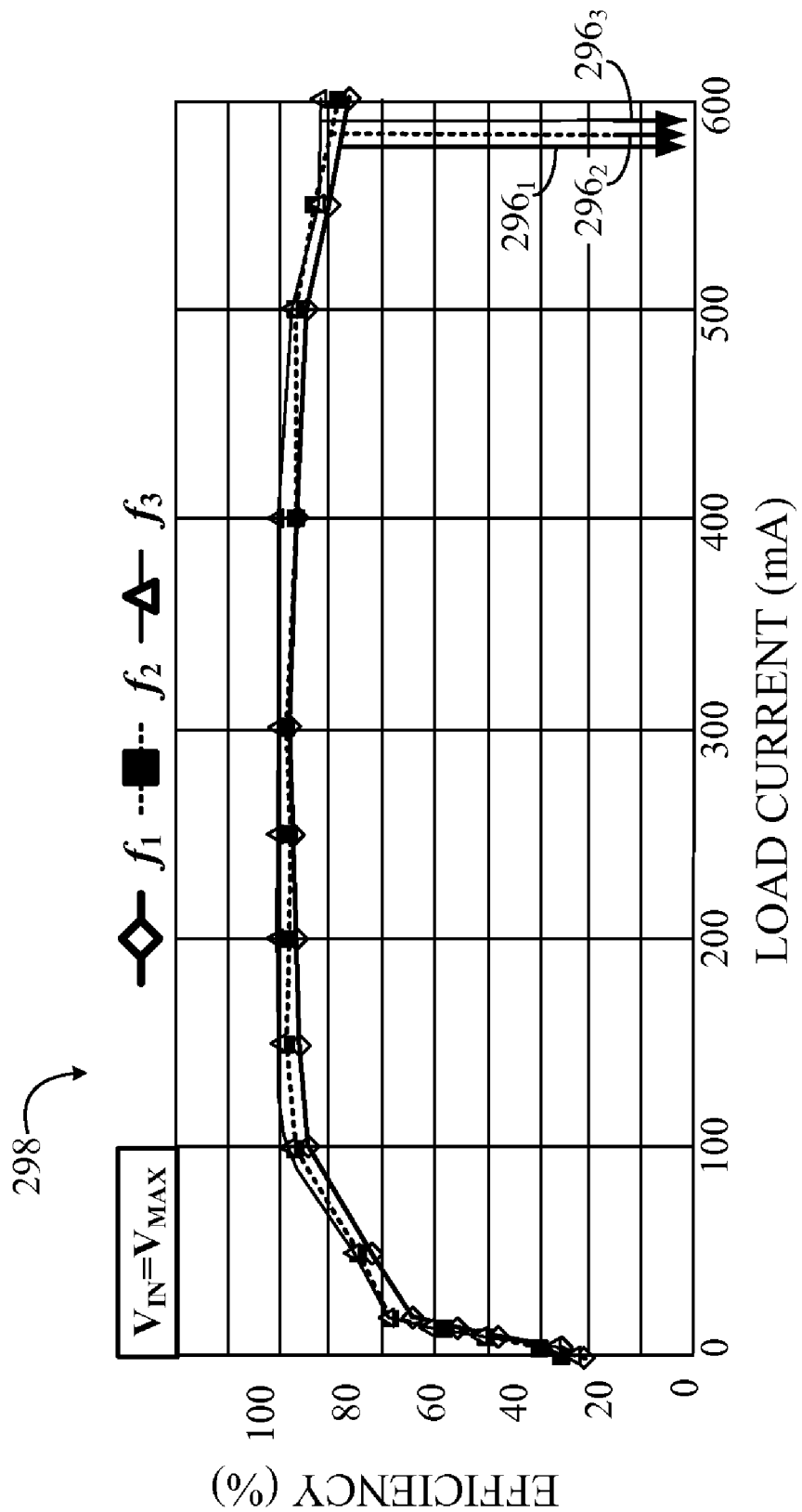

FIGS. 6-8 illustrate a set of three schematic charts respectively of SMPS delivered power efficiency versus load current at three disparate switching frequencies, and disparate DC input voltage $V_{IN}$. Diamond symbols correspond to a first switching frequency $f_1$, square symbols correspond to a second frequency $f_2$ lower than the first, and triangles to a third switching frequency lower than the first and second ones. Charts 290 (FIG. 6), 294 (FIG. 7), and 298 (FIG. 8) display qualitatively similar characteristics of power efficiency vs. load current at different frequency. In particular, (i) SMPS efficiency is nearly inversely proportional to its switching frequency. Such a behavior generally arises from the linear dependence with switching frequency of SMPS conversion loss, which is a simplified scenario when other quantities that affect efficiency or performance are substantially the same. (ii) Maximum load current at a specific switching frequency (e.g., $292_\lambda$ at $f_\lambda$, with $\lambda=1,2,3$ at $V_{IN}=V_{MIN}$) increases with decreasing switching frequency. In addition, higher input voltages result in larger maximum load currents like $296_\lambda$ at $V_{IN}=V_{TYP}$, with $V_{TYP}$ a typical operational voltage value, and $296_\lambda$ at $V_{IN}=V_{MAX}$. Maximum load current for a given switching frequency is the manifestation of circuitry non-ideality. Typically lower switching frequency does provide higher output load current while still maintaining regulation; yet, such response fails to prevent a SMPS from delivering higher load current at higher switching frequency under a proper design and when cost or technology allows it. Changing switching frequency to lower frequencies at non-critical operation generally improves overall efficiency.

Figure 9:
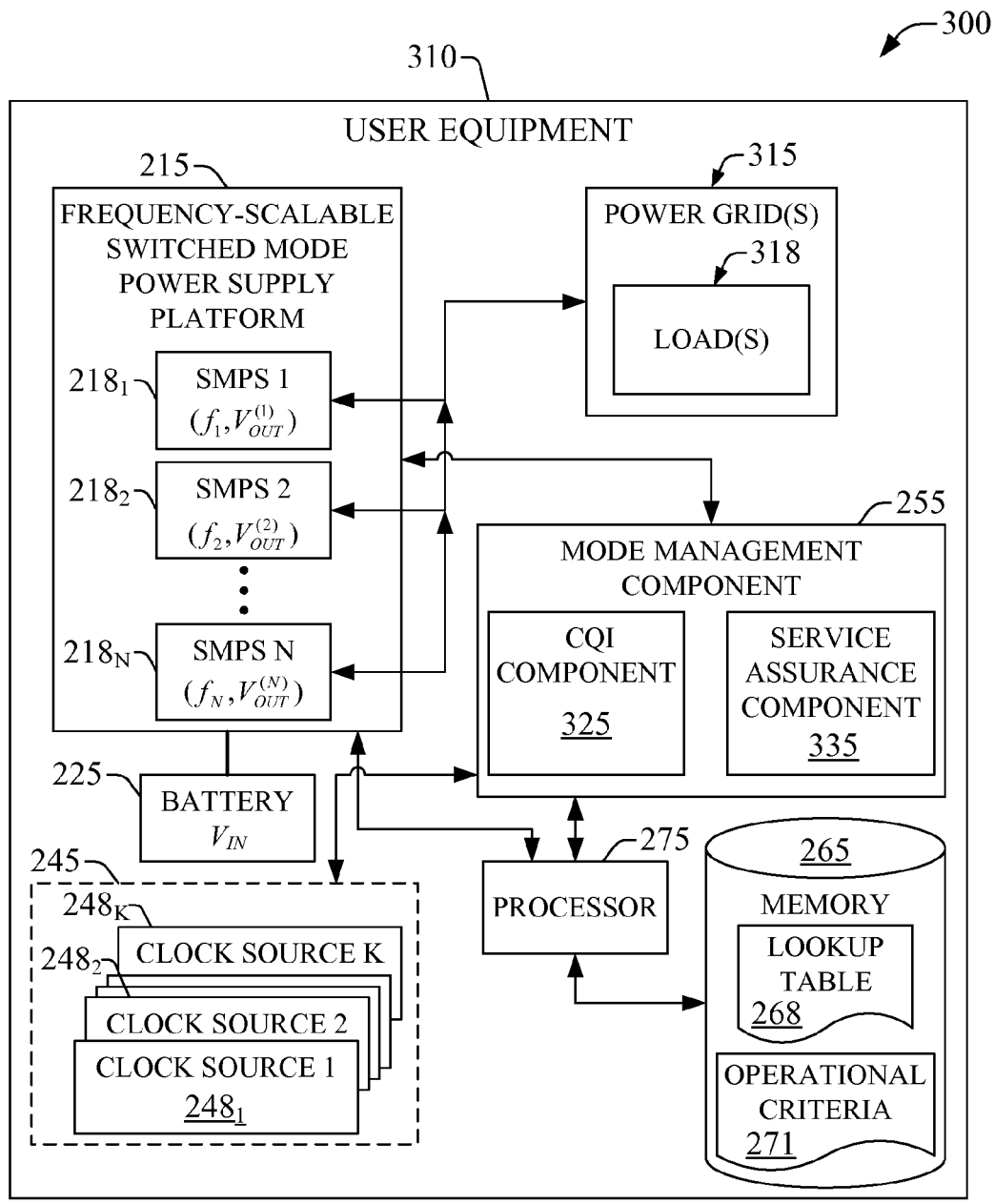
FIG. 9 depicts a block diagram of exemplary user equipment that can dynamically select and set one or more switching frequencies for power management through a set of SMPSs in accordance with aspects described herein.

FIG. 9 is a block diagram 300 of an example embodiment 310 of user equipment that can dynamically select and set one or more switching frequencies for power management through a set of SMPSs. Power grid(s) 315 includes load(s) 318 that provide, at least in part, functionality of user equipment 310. A frequency-scalable SMPS platform 215 comprises a set of SMPSs $218_1$-$218_N$. As discussed above, each SMPS $218_\lambda$ ($\lambda=1, 2, \ldots, N$) operates at a switching frequency $f_\lambda$ and outputs a voltage $V_{OUT}^{(\lambda)}$ that supplies power to load(s) 318 in power grid(s) 315. A set of clock sources 245 can be employed to drive a switch within one or more SMPSs in frequency-scalable platform 215 in substantially the same manner as discussed above in connection with user equipment 210. Likewise, mode management component 255 can operate in substantially the same manner as described above. In addition, in an aspect of UE 310, mode management component 255 can include a channel quality indicator (CQI) component 325 that can establish radio channel(s) conditions. In particular, CQI component 325 can determine spectral properties like frequency of sources of interference (e.g., jammer signal) that affect communication and operation of mobile 310. It should be appreciated that in frequency division duplex telecommunication systems, a transmitter output can act as a jammer signal.

Channel quality indicator component 255 can also monitor local oscillator (LO) spurs derived from coupling a SMPS (e.g., SMPS 2 $218_2$) and clock sources 245, or clock sources circuitry. In particular, CQI component 255 can determine whether an LO spur occurs at a frequency offset with a magnitude that equals M times the SMPS switching frequency (e.g., $f_2$); such frequency offset is herein termed an M-order resonance. It is to be noted that an M-resonance LO spur can critically desense operation of a mobile (e.g., UE 310) in the presence of an out-of-band jammer signal coupled a receiver input: When the frequency splitting between an LO spur and an associated LO center frequency (e.g., a clock source frequency which determines a SMPS switching frequency) equals, or is an integer multiple of, the frequency splitting between received signal and the out-of-band jammer signal, downcoversion of the LO spur at the receiver (e.g., UE 310) can spectrally shift the jammer signal into a frequency spectrum range wherein signal (e.g., traffic or control information) is received. (The aforementioned downconversion can be carried out by a transceiver in UE 310, a subset of load(s) 318 can facilitate operation of said transceiver.) Thus, CQI component 255 can determine whether the frequency splitting between a jammer signal and traffic or control signal is an integer multiple of an SMPS switching frequency, and adjust one or more switching SMPS frequencies that match such a condition. Mode management component 255, through processor 275, can adjust the one or more switching frequencies; the adjustment drives one or more SMPSs off-resonance and mitigates detrimental effects of SMPS-driven LO spurs. It is noted that CQI component 325 can determine whether an M-resonance LO spur occurs when mobile operation is handed-off to a new RF channel of operation, or when a receiver is triggered in a multi-receiver UE.

Mode management component 335 can also include a service assurance component 335 that can prevent service interruption (e.g., a dropped voice call or data exchange session, like a wireless banking transaction), or sustain service, as a result of switching frequency modifications in response to changes in operational conditions of the mobile 310. In particular, service assurance component 335 can retain service, or operation, when an M-order resonance between a jammer signal and a signal in a communication channel results in a switching frequency adjustment.

It is to be noted that in example UE embodiments 210 and 310, processor 275 is configured to perform at least a portion of the functional actions, e.g., computations, declarations, assignments, decisions, and substantially any other functional operation necessary to implement the functionality of substantially any component in the user equipment. Memory 265 can retain respective data structures (e.g., lookup tables), code instructions, algorithms, and the like, that can be employed by processor 245 when conferring user equipment 210 its functionality.

In view of the example systems, and associated aspects, presented and described above, methodologies for flexible channel quality indicator reporting that may be implemented in accordance with the disclosed subject matter can be better appreciated with reference to the flow diagrams of FIGS. 2, 10, 11-13 and 15. For purposes of simplicity of explanation, the methodologies are shown and described as a series of blocks, however, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof, or any other suitable means (e.g., device, system, process, component . . . ). It should be further appreciated that the methodologies disclosed hereinafter and throughout the subject specification can be stored on an article of manufacture, e.g., a computer-readable medium, to facilitate transporting and transferring such methodologies to various devices. Additionally, it should be understood that the methodologies could alternatively be represented as a series of interrelated states or events, such as in a state diagram.

Figure 10:
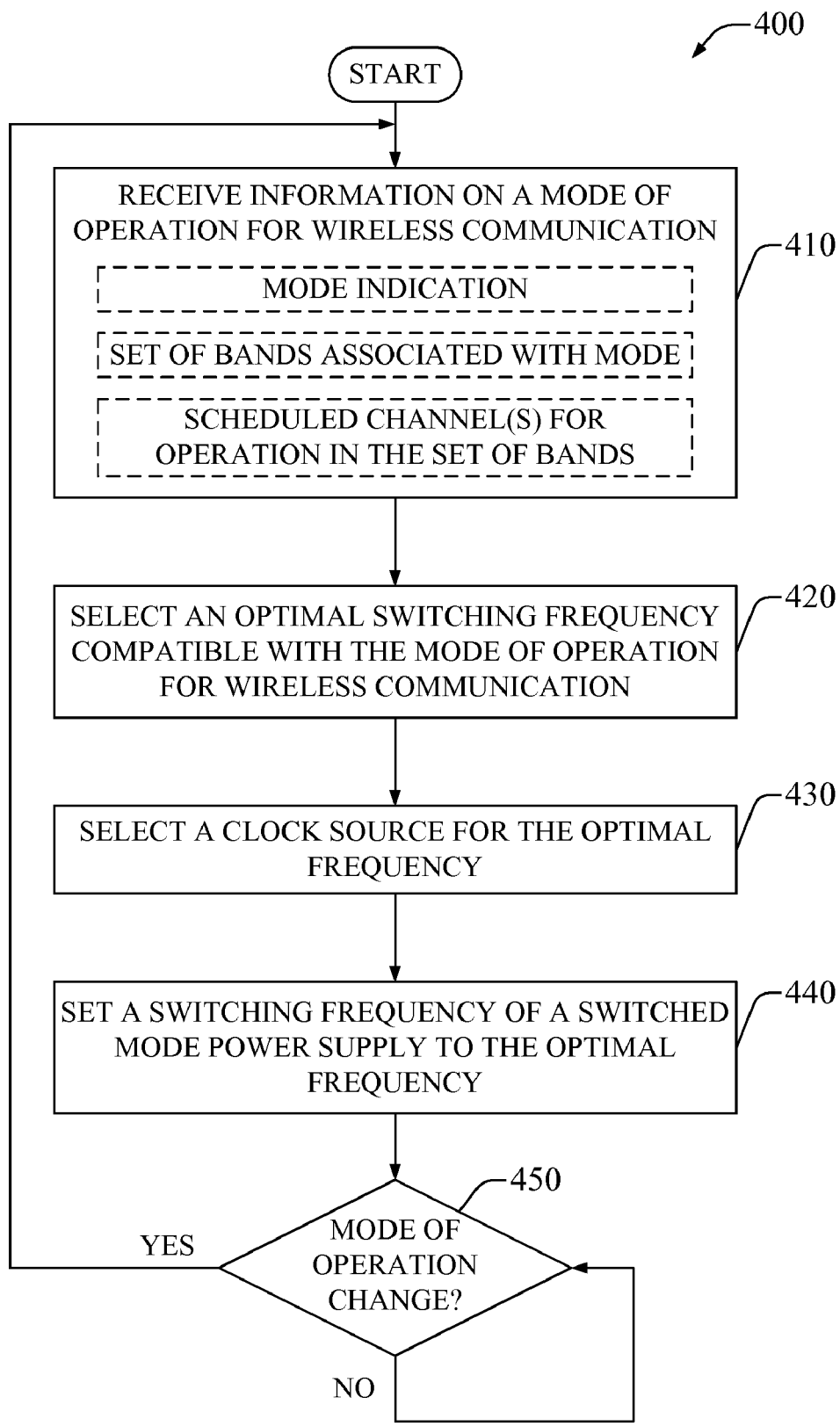
FIG. 10 depicts a flow diagram of an exemplary methodology for dynamically scaling a switching frequency of a SMPS that provides power management in a wireless mobile device in accordance with aspects described herein.

FIG. 10 presents a flowchart of an example method 400 for dynamically scaling a switching frequency of a SMPS that provides power management in a wireless mobile device according to aspects described herein. At act 410, information on a mode of operation for wireless communication is received. The information can include at least one of an indication that identifies the mode, a set of bands associated with the mode and operation thereof, or a scheduled channel(s) for operation in the set of bands, e.g., one or more channels employed to effectuate a communication like to maintain a voice or data call). In an aspect, information can be delivered by a mode management component like component 255, which can establish the mode of operation (e.g., CDMA 1× call, HSPA data exchange, GPS navigation application . . . ). Typically information is received by a processor (e.g., processor 275) configured to process the information and configure the operation of a set of SMPSs (e.g., frequency-scalable switched mode power supply platform 215). At act 420, an optimal frequency compatible with the mode of operation is selected. It should be appreciated that the mode of operation includes a set of bands and channels associated therewith. Selection can be dictated by the need to avoid interference with RF circuitry, or substantially any other circuitry, that facilitates operation of a mobile device in the specific mode of operation (e.g., GPS, CDMA, WiMAX, IR wireless . . . ). In an aspect, switching frequency, and derived harmonics, are selected to be spectrally decoupled from an EM radiation frequency band, or specific channel therein, utilized for mode operation. At act 430, a source clock for the optimal frequency is selected. Depending on operational conditions, source clock can be selected to mitigate battery drain, particularly in conditions of poor channel quality, during roaming, which typically involves bandwidth scanning to identify a suitable base station to handoff, or while consuming multimedia streaming data which generally strains battery in view of extensive operation of transceiver (e.g., for decoding of data stream) and utilization of display and sound resources as well. Additionally, clock source selection can be based at least in part on Q factor(s) of a clock that drives a switch in the SMPS, as discussed above in connection with FIG. 4. At act 440, a switching frequency in a SMPS is set to the selected optimal value. In an aspect, the optimal value can be partly adjusted to be consistent with the selected source clock, or it can be substantially modified through a clock generator, e.g., via a frequency divider, in order to ensure SMPS switching frequency fails to spectrally overlap with an EM radiation frequency channel(s) utilized for mobile operation. At act 450, a change in mode of operation is probed. In an aspect, in example system 460, such detection can be conducted by mode management component 255. Detection of a mode of operation change directs flow to act 410.

Figure 11:
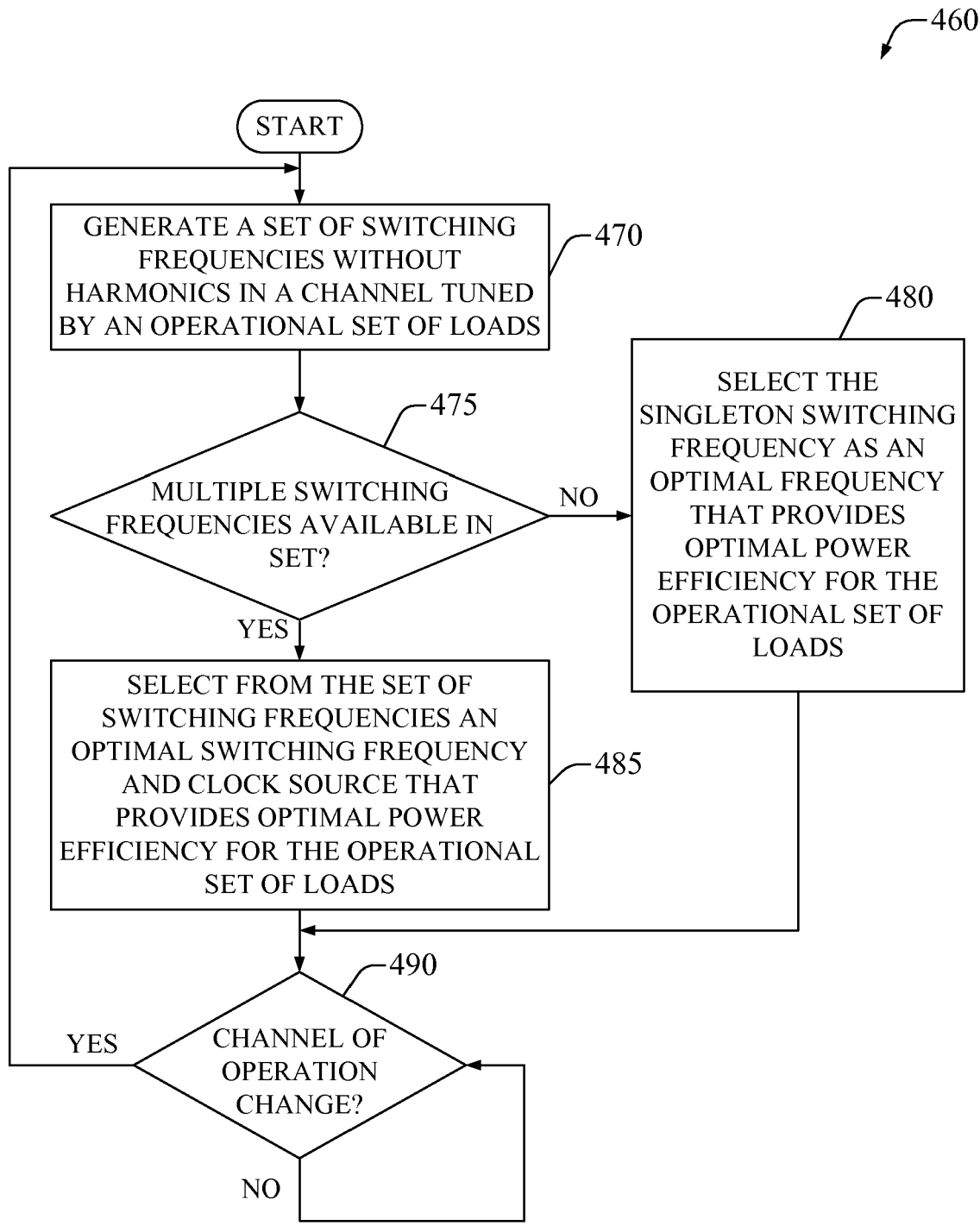
FIG. 11 depicts a flow diagram of another exemplary methodology for dynamically scaling a switching frequency of a SMPS that provides power management in a wireless mobile device in accordance with aspects described herein.

FIG. 11 presents a flowchart of an example method 460 to select an optimal switching frequency for a SMPS according to aspects described herein. At act 470, a set of switching frequencies without harmonics in a channel tuned by an operational set of loads is generated. The generated frequencies can be retained, for example, in a memory element like lookup table 268. The set of loads can be associated with electronic circuitry associated with functionality of a receiver specific for a mode of operation (e.g., reception and decoding of GPS radio frames, analog-to-digital conversion of speech in a CDMA voice session, generation and modulation of pilot signal(s) for control operation, . . . ) At act 475, it is checked whether multiple frequencies are available in the generated set of switching frequencies. In the negative case, at act 480 a singleton available switching frequency is selected as an optimal frequency that optimizes power efficiency delivered to a set of loads by a SMPS. In the affirmative case, a switching frequency and clock source that optimizes a power efficiency delivered by a SMPS to the operational set of loads is selected at act 485. At act 490, a change in operation channel associated with a mode of operation is probed. When the operation channel changes, flow is directed to act 470.

Figure 12:
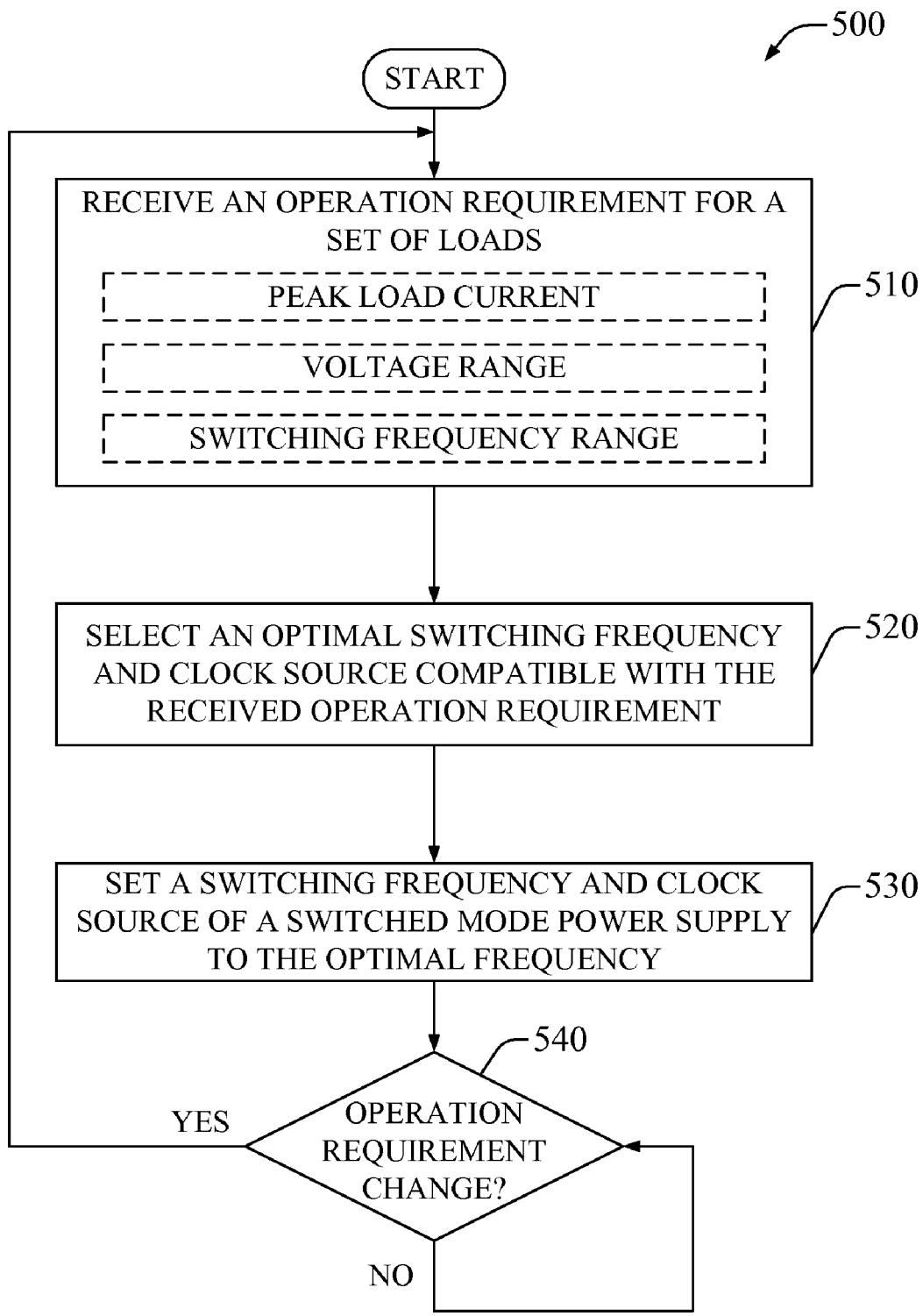
FIG. 12 depicts a flow diagram of an additional exemplary methodology for dynamically adjusting a switching frequency of a SMPS that provides power management in a wireless mobile device in accordance with aspects described herein.

FIG. 12 presents a flowchart of an example method 500 for dynamically adjusting a switching frequency of a SMPS that provides power management in a wireless mobile device in accordance with aspects described herein. In an aspect, example method 500 can complement example method 400. At act 510, an operation requirement for a set of loads is received. The set of loads can include a cluster of loads with common functional output (e.g., filtering, digitization, adder, multiplier or divider, modulation . . . ) or operational requirements. In an aspect, the received operation requirement can include at least one of a peak load current, a voltage range or a voltage magnitude within a range, or a switching frequency range. It should be appreciated that a frequency range can by dynamic since operation of multiple receivers within a mobile can result in interference(s) among loads, or loads and local oscillators. An indication of, or information on, an operation requirement such as a peak load current can be the result of changes in operational state of a set of loads (e.g., $241_1$-$241_Q$) due to adjustment of an operation state—for example, active to inactive like in case a receiver is shut down within the mobile, high-current demand to low-current demand, etc.— of a set of loads that support operation of a mobile device. At act 520, an optimal switching frequency and clock source compatible with the received operation requirement is selected. At act 530 a switching frequency and clock source in a SMPS serving a power grid that includes the set of loads is set to the selected optimal value. At act 540, a change in operation requirement (e.g., peak load current) is probed, when a change is detected (typically by a processor providing control of a set or SMPSs; e.g., processor 275), flow is directed to act 510.

Figure 13:
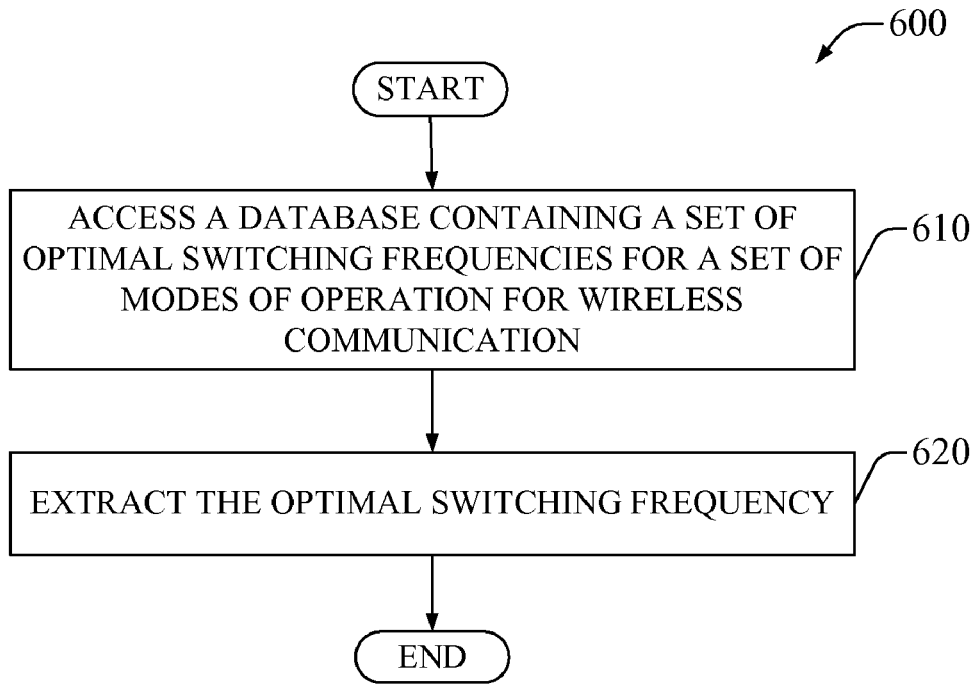
FIG. 13 depicts a flow diagram of another additional exemplary methodology for determining an appropriate frequency for switching in a SMPS according to aspects set forth herein.

FIG. 13 is a flowchart of an example method 600 for determining an optimal frequency for switching in a SMPS according to aspects described herein. At act 610 a database containing a set of optimal switching frequencies for a set of modes of operation for wireless communication is accessed. In an aspect, the database includes a lookup table (e.g., lookup table 268), wherein the set of optimal switching frequencies for the set of modes of operation are stored. Storage can take place in memory 265. The lookup table can be provided by a manufacturer of a wireless device (e.g., UE 210) that is capable of multi-mode operation (e.g., GSM, CDMA, WCDMA, GPS, WiMAX . . . ). Generation of the lookup table generally can be based at least in part on extensive experimentation in laboratory condition(s) for operation, or on-the-field operation. An optimal switching frequency is extracted at act 620.

Figure 14:
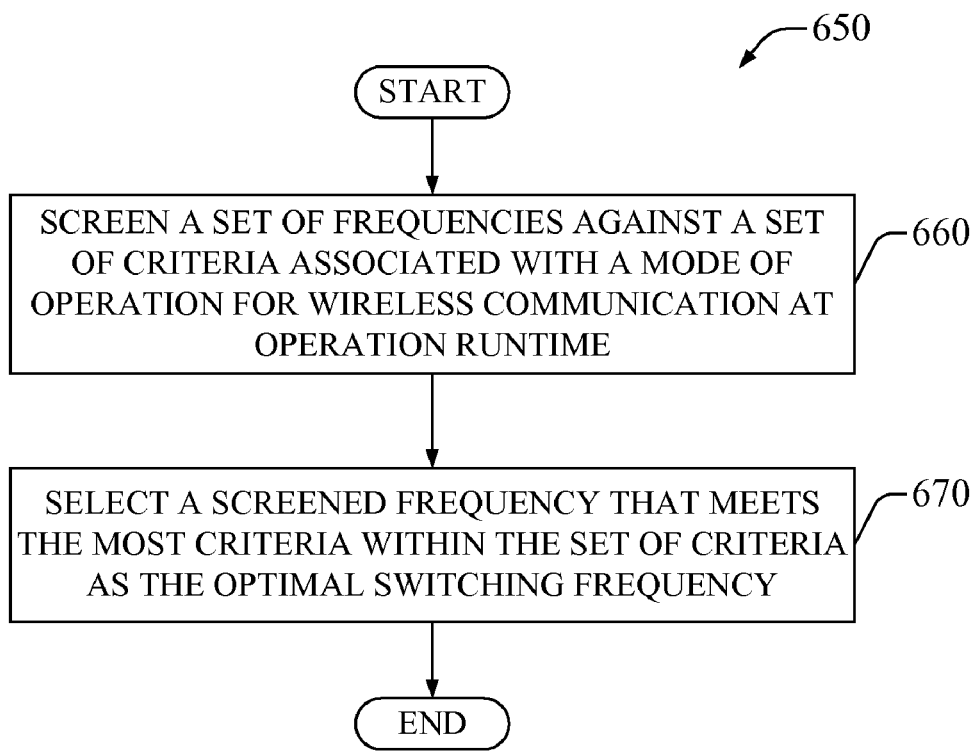
FIG. 14 depicts a flow diagram of yet another exemplary methodology for determining an appropriate frequency for switching in a SMPS according to aspects set forth herein.

FIG. 14 is a flowchart of an example method 650 for determining an optimal frequency for switching in a SMPS according to aspects described herein. It should be appreciated that example method 650 can be alternative or additional to example method 600. At act 660, a set of frequencies is screened against a set of criteria associated with a mode of operation for wireless communication at operation runtime. The criteria can include at least one of technical aspects of operation of a specific set of loads, like peak load current(s), or quality of service requirements (e.g., low battery drain, low jitter in a speech call, fixed block error rate . . . ) associated with such operation. As an example, a criterion can be that a frequency fails to yield a harmonic in substantially any operational EM radiation frequency channel or band. The set of frequencies can include each available switching frequency as determined by a set of clock sources (e.g., clock sources $248_1$-$248_K$) and associated clock generators (e.g., clock gen. $285_1$-$285_M$). In an aspect, a software or firmware application can be executed to perform the screening at runtime, when the mode of operation is initiated. At act 670, a screened frequency that meets most of the criteria in the set of criteria is selected as the optimal switching frequency for the utilized mode of operation.

Figure 15:
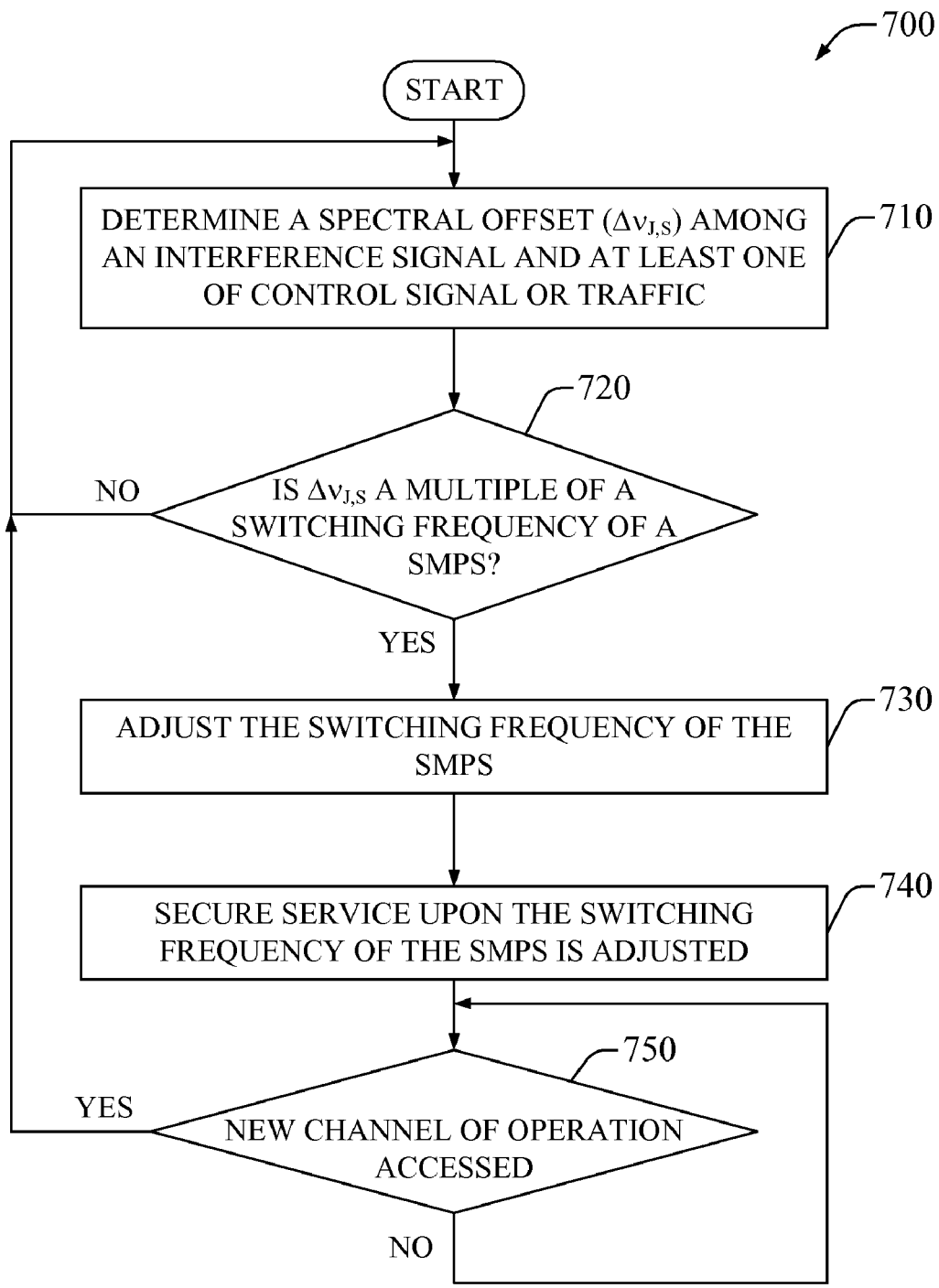
FIG. 15 depicts a flow diagram of a further exemplary methodology for mitigating interference in a receiver according to aspects described herein.

FIG. 15 is a flowchart of an example method 700 for mitigating interference due to coupling of a local oscillator and a SMPS in a receiver according to aspects described herein. At act 710, a frequency spectral offset $\Delta v_{J,S}$ among an interference signal and at least one of a control signal or traffic is determined. In an aspect, determination of $\Delta v_{J,S}$ can include spectral analysis (e.g., Fourier decomposition and power spectral density (PSD) analysis) of noise in a wireless environment in which a receiver operates. As an example, a jammer signal can have a narrow frequency distribution centered at the jammer frequency ($v_J$) which can be identified via PSD analysis of a sampled time sequence of a received signal. As another example, in a frequency division duplex (FDD) telecommunication system, a jammer signal can be a transmitter output leaking into a receiver input. In such a case, jammer signal and receive signal frequencies can be known in view of design of a component (e.g., mode management component 255) that controls SMPS clocks. At act 720, the magnitude of the frequency spectral offset is assessed, probing whether $\Delta v_{J,S}$ is a multiple of a switching frequency (e.g., $f_N$) of a SMPS (e.g., SMPS $218_N$) that serves a set of loads (loads $244_1$-$244_P$) that facilitate operation of a receiver (e.g., UE 310). In the affirmative case, the switching frequency (e.g., $f_N$) of the SMPS is adjusted at act 730. Conversely, flow is directed to act 710. At act 740, service is secured, or sustained, upon the switching frequency of the SMPS is adjusted. It should be appreciated that modification of the switching frequency can lead to an operation failure condition when, for example, the adjusted frequency is insufficient to deliver a peak load current or meet substantially any operational conditions of a set of loads employed in a mode of operation that provide service (e.g., sustain a voice or data call). In an aspect, service assurance component 335 can mitigate such operation failure. At act 750, it is probed whether a new channel of operation is accessed. Access to a new RF channel can arise from handover to a new RF band, or triggering a new receiver mode in addition to an existing mode of operation; e.g., a GPS receiver is switched on during a call within 3G UMTS mode of operation.

Figure 16:
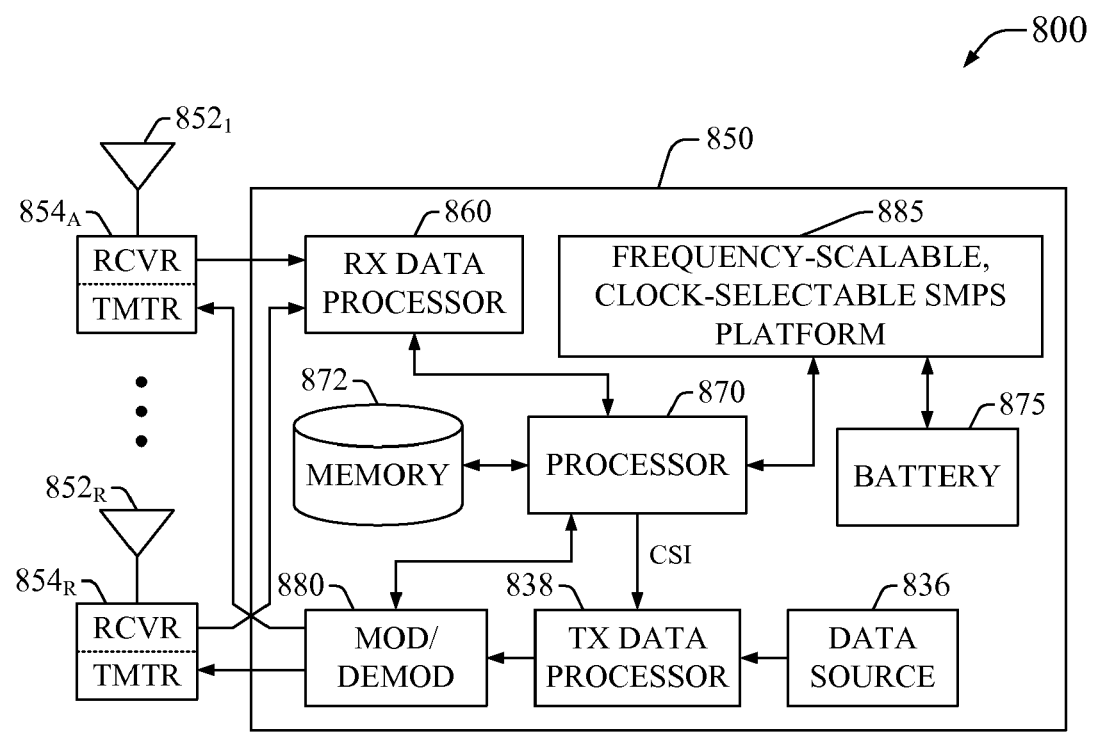
FIG. 16 depicts a block diagram of an exemplary receiver system that can enable switching frequency scalability in a wireless communication environment in accordance with one or more aspects set forth herein.

FIG. 16 is a block diagram of an example embodiment 800 of a receiver system 850 (e.g., ULE 310) that can exploit dynamic scaling of a switching frequency in a SMPS in a wireless communication environment in accordance with one or more aspects described herein. In receiver system 850, transmitted modulated signal(s) can be received by $N_R$ antennas $852_1$ through $852_R$, and the received signal from each antenna can be conveyed to a respective transceiver (RCVR/TMTR) $854_1$ through $854_R$. Antennas $852_1$-$852_R$ and transceivers $854_1$-$854_R$ can facilitate communication within multiple-input multiple output (MIMO) communication mode. It should be appreciated that various implementation of MIMO communication, like multiuser MIMO, single-user MIMO, or distributed MIMO, can be implemented in receiver 850. Each transceiver $854_1$-$854_R$ conditions (e.g., filters, amplifies, and down-converts) a respective received signal, digitizes the conditioned signal to provide samples at a specific sampling rates, and further processes the samples to provide a corresponding "received" symbol stream. It is to be noted that circuitry associated with filtering, amplifying, down-converting, digitizing, and so on, constitutes various set of loads which can be arranged in a set of power grids (e.g., power grids $235_1$-$235_N$), such power grids are powered, or served, by a set of SMPSs. In accordance with an aspect of the subject innovation, the set of SMPSs can reside in frequency-scalable, clock-selectable SMPS platform 885, and can operate under optimal conditions based at least in part upon current load requirements and mode of operation of the receiver, e.g., mode to receive and convey information via transceivers $854_1$ through $854_R$. A battery 875 provides power to frequency-scalable SMPS platform 885.

An RX data processor 860 collects and processes the NR received symbol streams from NR transceivers $854_1$-$854_R$ based on one or more receiver processing technique(s) to provide NT (e.g., a number of transmit transceivers that generate the received signal) "detected" symbol streams. For instance, such processing techniques can include maximum likelihood (ML) estimation, minimum mean square equalization (MMSE), zero forcing (ZF) filtering, maximal ratio combining (MRC) filtering. Such processing techniques can incorporate a successive interference cancellation (SIC) component, and can include computation of direct/inverse fast Fourier transformation(s); or direct/inverse Hadamard transformation(s). It is to be noted that circuitry associated with implementation of such processing techniques constitute various loads that can be part of one or more power grids which can be powered through frequency-scalable SMPS platform 885. The RX data processor 860 then demodulates, deinterleaves, and decodes each detected symbol stream to recover the traffic data or control information for the data stream; MOD/DEMOD component 880 performs such operations assisted, at least in part, by processor 870. It is to be appreciated that loads can also be associated with circuitry that facilitates demodulating, deinterleaving, and decoding. Such loads can be powered by SMPSs in platform 885.

It is to be noted that receiver 850 can also convey traffic or signaling (e.g., pilot sounding reference signal(s)). While signaling or control information is typically generated via processor 870, traffic is typically generated by an end-user that sustains a call (e.g., voice session) or utilizes an application (e.g., email, web browser ... ). Data source 836 facilitates traffic generation and can include an interface (e.g., microphone, camera, etc.) that captures information and data as well. Traffic is conveyed to a TX data processor that manipulates data in accordance to various techniques like conversion from analog to digital content, and conveys processed data to MOD/DEMOD component 880 to generate a data flow or stream that is compatible with the mode of operation (e.g., CDMA 1×, GPS, UMB) utilized by receiver 850 for communication.

A processor 870 periodically determines which pre-coding matrix to utilize, such a matrix can be stored in memory 872. Precoding operation can also exploit specific circuitry and associated load(s) powered by frequency-scalable SMPS platform 885. It should be appreciated that processor 870 is also configured to operate frequency-scalable SMPS platform 885, executing code instructions that facilitate such operation. Memory 872 may store the code instructions, in addition to algorithms, that can be executed by a processor (e.g., processor 870) to confer a specific functionality to one or more component of receiver 850. Memory 872 can also retain data structures, and databases that provide actionable information for operation of receiver 850. In addition, memory 872 can include a set of criteria associated with optimal mode of operation for wireless communication that can be utilized to select an optimal switching frequency for one or more SMPSs. Databases in memory 872 include lookup tables comprising optimal switching frequencies in accordance with a mode of operation and load.

Next, a system that can enable aspects of the disclosed subject matter is described in connection with FIG. 17. Such a system can include functional blocks, which can be functional blocks that represent functions implemented by a processor or an electronic machine, software, or combination thereof (e.g., firmware).

Figure 17:
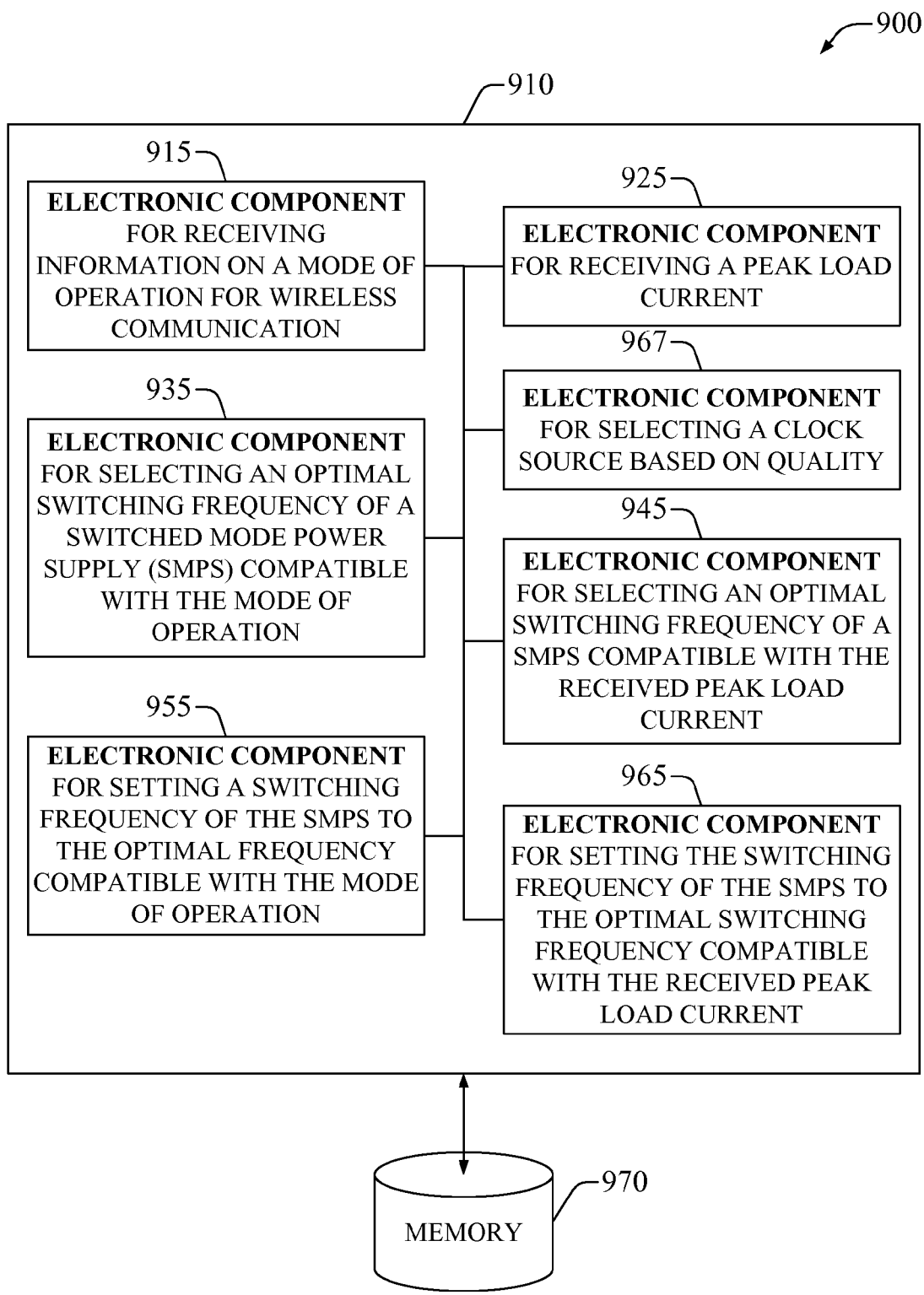
FIG. 17 depicts a block diagram of an exemplary system that enables generation of net noise estimates in the presence of phase noise in accordance with aspects described herein.

FIG. 17 illustrates a block diagram of an example system 900 that enables dynamic adjustment(s) of switching frequency in a switched mode power supply (SMPS) in accordance with aspects described herein. System 900 can reside at least in part within a mobile station (e.g., UE 310), and can include a logical grouping 910 of electronic components that can act in conjunction. In an aspect of the subject innovation, logical grouping 910 includes an electronic component 915 for receiving information on a mode of operation for wireless communication; an electronic component 925 for receiving a peak load current; an electronic component 935 for selecting an optimal switching frequency of a SMPS compatible with the mode of operation; and electronic component 945 for selecting an optimal switching frequency of a SMPS compatible with the received peak load current. In addition, logical grouping 910 includes an electronic component 955 for setting a switching frequency of the SMPS to the optimal frequency compatible with the mode of operation; an electronic component 965 for setting a switching frequency of the SMPS to the optimal switching frequency compatible with the received peak current load; and an electronic component 967 for selecting a clock source based on quality.

System 900 can also include a memory 970 that retains instructions for executing functions associated with electronic components 915, 925, 935, 945, 955, 965 and 967, as well as measured or computed data that may be generated during executing such functions. While shown as being external to memory 970, it is to be understood that one or more of electronic components 915, 925, 935, 945, 955, 965 and 967 can exist within the memory 1570.

It should be appreciated with the benefit of the present disclosure that illustrative aspects describe wireless communications that particularly benefit from enhanced frequency/ clock source selection for switched mode power supplies. However, applications consistent with aspects described herein can benefit that do not include wireless communication. For instance, the load can be susceptible to electromagnetic interference and compatibility issues at certain frequencies that degrade performance. Device components can have changing power requirements that arise without a change in a transmission mode. Moreover, motivations for providing adequate and efficient power supply and regulation need not be confined to serving portable devices. For instance, a more economic design or less device heating can be achieved by better frequency selection/clock source selection.

It should be appreciated by the benefit of the forgoing, that in some aspects the subject innovation provides system(s) and method(s) for dynamically scaling switching frequencies and selecting clock sources of switched mode power supplies (SMPSs) in a mobile station. Switching frequency is dynamically adjusted in response to a change in mode of operation for wireless communication employed by the mobile station, the selection of an additional mode to be operated concurrently with mode(s) already in use, a change in band or channel associated with a mode of operation, or a change in operation conditions of a set of loads associated with functionality of the mobile. Switching frequencies of SMPSs can be adjusted to avoid or mitigate radio impairments introduced by such changes, such as when a harmonic of the switching frequency falls in a channel being received by the mobile station, or such as when an interfering signal present at a receiver input has a frequency separation from the receive channel that is near a harmonic of the switching frequency. Switching frequencies can be selected from a lookup table that associates optimal acceptable frequencies, or frequency ranges, with various modes of operation, bands, or channels. Alternatively, or in addition, acceptable frequencies can be selected through a comparison of switching frequencies available to the mobile against a set of operational criteria expressed as mathematical constraints that must be satisfied by an acceptable switching frequency. A set of clock sources can provide an ensemble of switching frequencies, which can be adjusted to attain an acceptable switching frequency.

For a software implementation, the techniques described herein may be implemented with modules (e.g., procedures, functions, and so on) that perform the functions described herein. The software codes or code instructions may be stored in memory units, or memories computer-readable media, and executed by processors. A memory unit, or memory, may be implemented within the processor or external to the processor, in which case it can be communicatively coupled to the processor via various conventional means.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As it employed herein, the term "processor" comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the terms "includes," "including," "possess," and possessing," or "has" and "having" are used in the subject specification, such terms are intended to be inclusive in a manner similar to the term "comprising" as "comprising" is interpreted when employed as a transitional word in a claim.

What is claimed is:

1. A method for dynamically adjusting a frequency scalable switched mode power supply (SMPS), the method comprising:
   determining a mode of operation for a load component;
   determining a power requirement of the mode of operation; and
   selecting a switching frequency source appropriate for a SMPS to power the mode of operation of the load component in accordance with the power requirement, further comprising determining the power requirement comprising a radio frequency sensitivity of the mode of operation.

2. The method of claim 1, further comprising selecting a switching frequency having integer multiple of that switching frequency within a band of radio frequency sensitivity.

3. The method of claim 1, further comprising selecting a switching frequency having a center frequency within a band of radio frequency sensitivity.

4. The method of claim 1, wherein the radio frequency sensitivity of the mode of the operation arises due to proximate components susceptible to electromagnetic interference.

5. The method of claim 1, further comprising determining the power requirement comprising a peak load current of the mode of operation and the radio frequency sensitivity of the mode of operation.

6. The method of claim 1, further comprising selecting a clock source that produces a switching frequency spectra attenuated at a sensitive radio frequency of the load component.

7. The method of claim 1, further comprising selecting a scaled version of a clock source.

8. The method of claim 7, further comprising selecting a scaled version of the clock source by altering a frequency of a clock source using an SMPS clock generator block.

9. The method of claim 8, further comprising altering the frequency of the clock source using an SMPS clock generator block comprising a frequency divider with programmable divider modulus.

10. An apparatus for dynamically adjusting a frequency scalable switched mode power supply (SMPS), the apparatus comprising:
    a mode detector for determining a mode of operation for a load component:
    a switching frequency selector component for determining a power requirement of the mode of operation:
    a switched mode power supply (SMPS) that supplies the load component; and
    the switching frequency selector component for selecting a switching frequency source appropriate for the SMPS to power the mode of operation of the load component in accordance with the power requirement, wherein the switching frequency selector component is further for the frequency selector component for determining the power requirement comprising a radio frequency sensitivity of the mode of operation.

11. An apparatus for dynamically adjusting a frequency scalable switched mode power supply (SMPS), the apparatus comprising:
    a mode detector for determining a mode of operation for a load component;

a switching frequency selector component for determining a power requirement of the mode of operation;
a switched mode power supply (SMPS) that supplies the load component; and
the switching frequency selector component for selecting a switching frequency source appropriate for the SMPS to power the mode of operation of the load component in accordance with the power requirement, wherein the switching frequency selector component is further for selecting a switching frequency having integer multiple of that switching frequency within a band of radio frequency sensitivity.

12. The apparatus of claim 10, wherein the switching frequency selector component is further for selecting a switching frequency having a center frequency within a band of radio frequency sensitivity.

13. The apparatus of claim 10, wherein the radio frequency sensitivity of the mode of the operation arises due to proximate components susceptible to electromagnetic interference.

14. The apparatus of claim 10, wherein the frequency selector component is further for determining the power requirement comprising a peak load current of the mode of operation and the radio frequency sensitivity of the mode of operation.

15. The apparatus of claim 10, further comprising the frequency selector component for selecting a clock source that produces switching frequency spectra attenuated at a sensitive radio frequency of the load component.

16. The apparatus of claim 10, further comprising the frequency selector component for selecting a scaled version of a clock source.

17. The apparatus of claim 16, wherein the switching frequency selector component is further for selecting a scaled version of the clock source by altering a frequency of a clock source using an SMPS clock generator block.

18. The apparatus of claim 16, wherein the switching frequency selector component is further for altering the frequency of the clock source using an SMPS clock generator block comprising a frequency divider with programmable divider modulus.

* * * * *